(12) United States Patent  
Akita

(10) Patent No.: US 7,760,618 B2  
(45) Date of Patent: Jul. 20, 2010

(54) METHOD OF TRANSMITTING OFDM SIGNAL AND TRANSMITTER AND RECEIVER THEREOF

(75) Inventor: Koji Akita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 320 days.

(21) Appl. No.: 11/776,573

(22) Filed: Jul. 12, 2007

(65) Prior Publication Data

US 2007/0258357 A1  Nov. 8, 2007

Related U.S. Application Data

(63) Continuation of application No. PCT/JP2007/055321, filed on Mar. 12, 2007.

(30) Foreign Application Priority Data

Mar. 17, 2006  (JP) .............................. 2006-075726

(51) Int. Cl.  
*H04J 11/00* (2006.01)

(52) U.S. Cl. ...................... 370/208; 370/203; 370/491; 375/260

(58) Field of Classification Search ................. 370/203, 370/208; 375/260, 267  
See application file for complete search history.

(56) References Cited

U.S. PATENT DOCUMENTS

2004/0165676 A1* 8/2004 Krishnan et al. ............ 375/267  
2004/0257979 A1* 12/2004 Ro et al. ..................... 370/208  
2005/0157801 A1* 7/2005 Gore et al. .................. 375/260  
2005/0180312 A1* 8/2005 Walton et al. ............... 370/208  
2006/0009224 A1 1/2006 Lim et al.

FOREIGN PATENT DOCUMENTS

EP   0 902 551 A2   3/1999  
JP   2007-300217    11/2007

OTHER PUBLICATIONS

U.S. Appl. No. 11/619,328, filed Jan. 3, 2007, Akita.  
R1-051300, "MBMS transmission in E-UTRA", 3GPP TSG RAN WG1 #43, Nov. 7-11, 2005, Seoul, Korea.  
R1-061264, "Further Study on Reference Signal Structure for MBMS", TSG-RAN WG1 #45, May 8-12, 2006, Shanghai, China., http://www.3gpp.org/ftp/tsg-ran/WG1-RL1/TSGR1-45/Docs/R1-061264.zip, May 2, 2006.

(Continued)

*Primary Examiner*—Ricky Ngo  
*Assistant Examiner*—Rasheed Gidado  
(74) *Attorney, Agent, or Firm*—Oblon, Spivak, McClelland, Maier & Neustadt, L.L.P.

(57) ABSTRACT

A method of transmitting OFDM signals including, allocating a first pilot signal and a first data signal which are both common among OFDM transmitters respectively to at least one first pilot subcarrier and first data subcarriers within a specific time-frequency domain that is common among the OFDM transmitters and different among wireless transmitting units, allocating a second pilot signal and a second data signal respectively to second pilot subcarrier and second data subcarriers outside the time-frequency domain, multiplying the first pilot signal and the first data signal by a complex number set for the time-frequency domain, generating an OFDM signal by performing OFDM modulation on the first pilot signal and the first data signal multiplied by the complex number and the second pilot signal and the second data signal, and transmitting the OFDM signal.

27 Claims, 17 Drawing Sheets

OTHER PUBLICATIONS

Michael Speth, et al. "Optimum Receiver Design for OFDM-Based Broadband Transmission—Part II: A Case Study", IEEE Transactions on Communications, XP-002255287, vol. 49, No. 4, Apr. 2001, pp. 571-578.

Toshiba Corporation and NTT DoCoMo, MBMS Channel Structure for Evolved UTRA, 3GPP TSG-RAN WG1 #44 R1- 060527, 3GPP, Feb. 13-17, 2006, p. 1-6.

Toshiba Corporation, MBMS Structure for Evolved UTRA, 3GPP TSG RAN WG1 LTE Ad Hoc Meeting R1-060182, 3GPP, Jan. 23-25, 2006.

Koji Akita et al., "Pilot Channel Configuration for High-Speed Mobile Environment in OFDM cellular communications", A Collection of Research Papers Reported at the General Assembly of The Institute of Electronics, Information and Communication Engineers (IEICE), Communication 1, Mar. 8, 2006, pp. 434, B-5-81.

3GPP TR 25. 814 V1.0.3, 3GPP, Feb. of 2006, pp. 18-20, $3^{rd}$ Generation Partnership Project; Technical specification Group Radio Access Network; Physical Layer Aspects for Evolved UTRA (Release 7).

Koji Akita et al., "Proposal No. 1 for Micro-Diversty System in OFDM Broadcast", Collection 1 of Research Papers Reported at the Communication Society Assembly of The Institute of Electronics, Information and Communication Engineers (IEICE), Sep. 7, 2006, p. 387, B-5-27.

Koji Akita et al., "Proposal No. 2 for Micro-Diversity System in OFDM Broadcase", Collection 1 of Research papers Reported at the Communication Society Assembly of The institute of Electronics, Information and Communcation Engineers (IEICE), Sep. 7, 2006, p. 388, B-5-28.

* cited by examiner

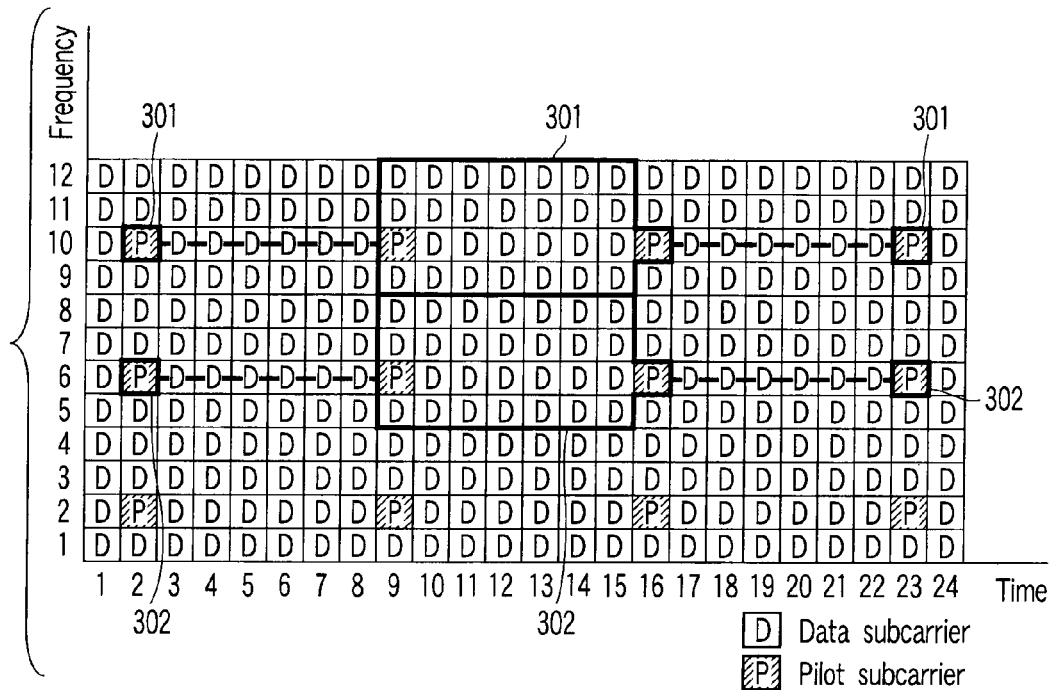
F I G. 13
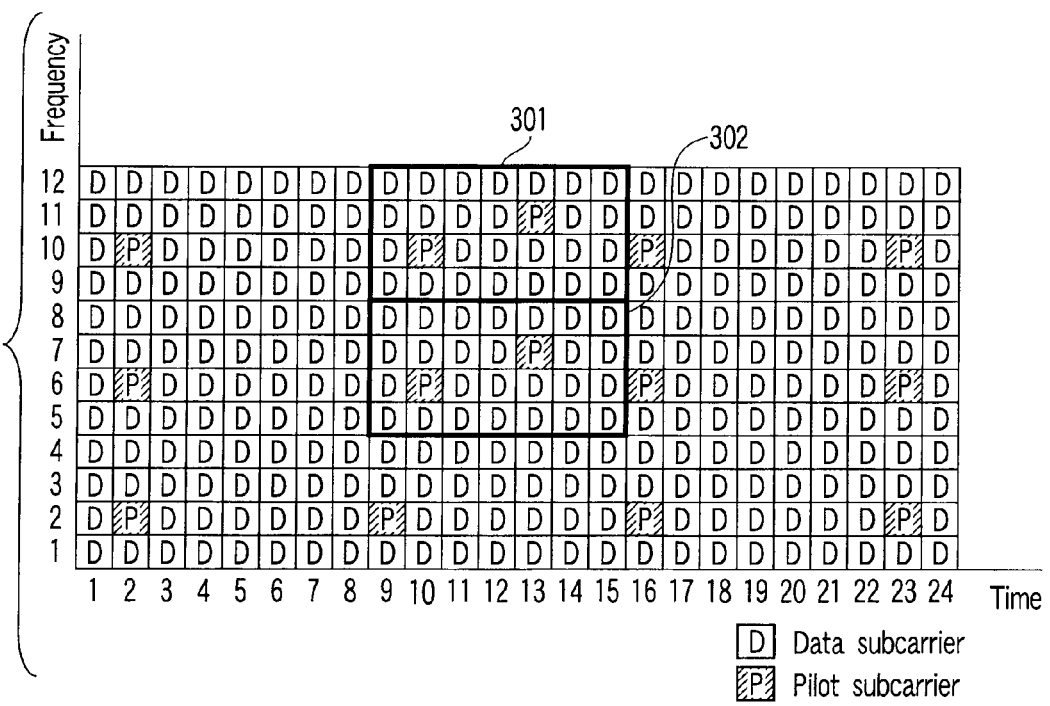
F I G. 14

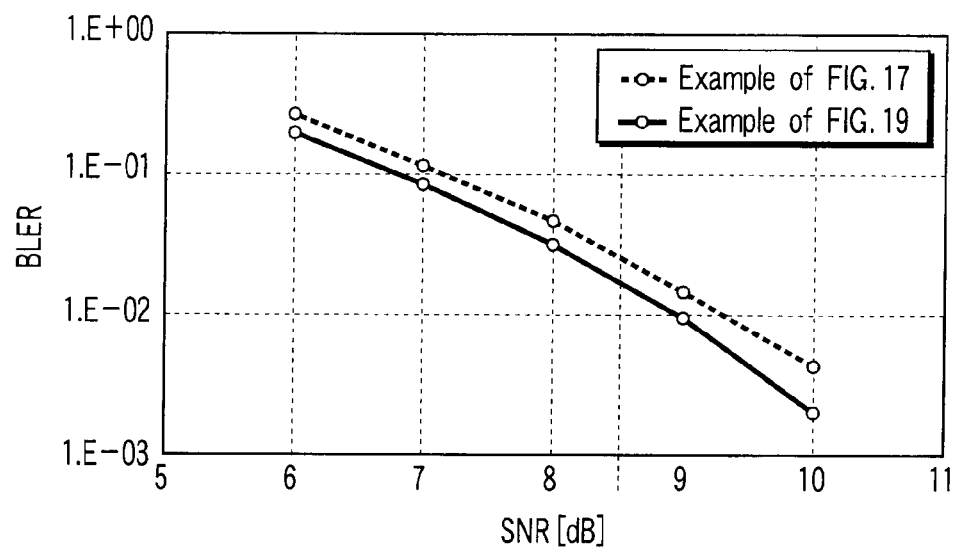
F I G. 21
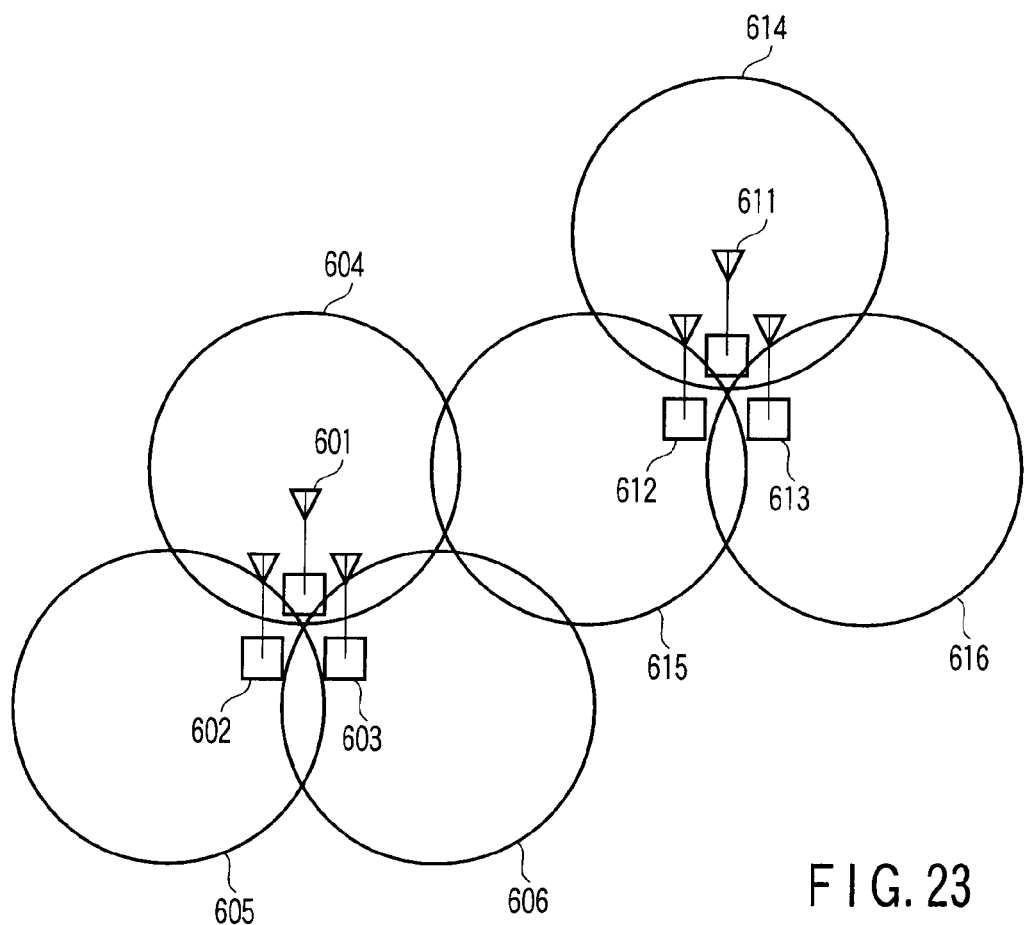
F I G. 23

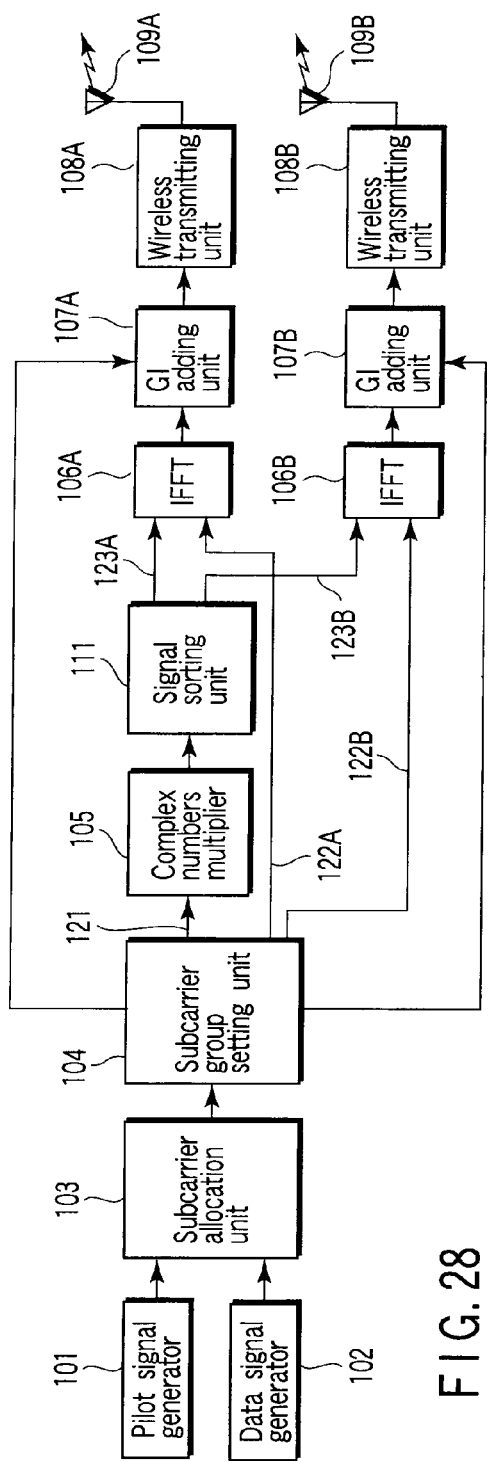
F I G. 28
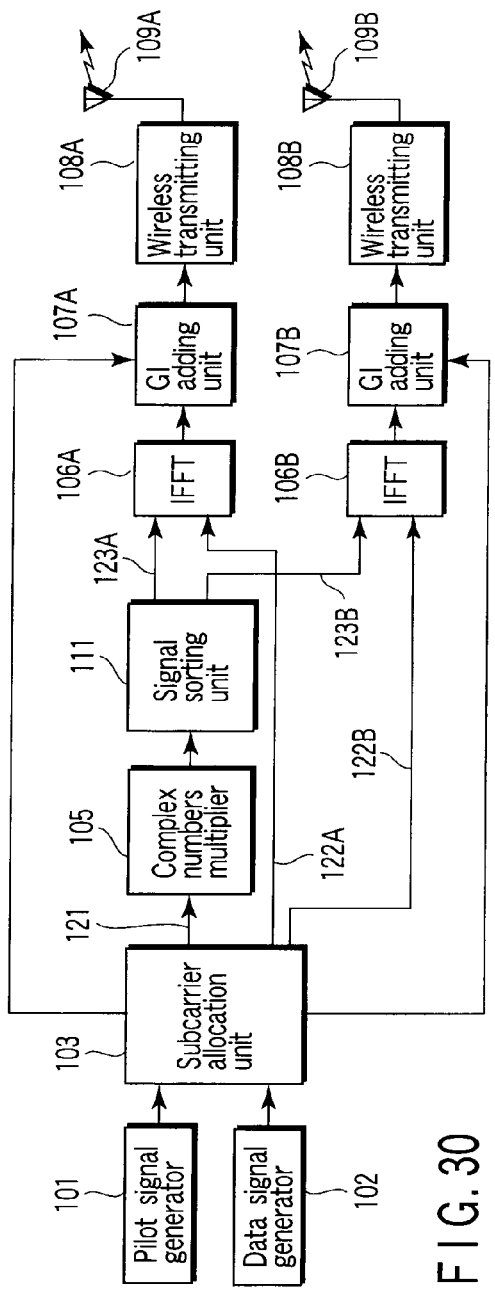
F I G. 30

METHOD OF TRANSMITTING OFDM SIGNAL AND TRANSMITTER AND RECEIVER THEREOF

CROSS REFERENCE TO RELATED APPLICATIONS

This is a Continuation Application of PCT Application No. PCT/JP2007/055321, filed Mar. 12, 2007, which was published under PCT Article 21(2) in English.

This application is based upon and claims the benefit of priority from prior Japanese Patent Application No. 2006-075726, filed Mar. 17, 2006, the entire contents of which are incorporated herein by reference.

BACKGROUND OF THE INVENTION

1. Field of the Invention

The present invention relates to a method of transmitting an orthogonal frequency division multiplexing (OFDM) signal and a transmitter and receiver thereof.

2. Description of the Related Art

A macro diversity reception technique is known as one of the techniques for reception in a wireless communication system. In macro diversity, the same pilot signal and the same data signal are transmitted from a plurality of transmitters by the same carrier frequency. Such signals transmitted from each transmitter are received and combined at a receiver to obtain a predetermined gain. R1-051300, "MBMS transmission in E-UTRA", LG Electronics, 3GPP TSG RAN WG1# 43, Nov. 7-11, 2005 discloses a frame structure for performing macro diversity in an OFDM wireless communication system where signals that adapt and do not adapt macro diversity reception coexist.

In the frame structure the pilot signals are scrambled using a scrambling pattern set for each transmitter. Data signals are not scrambled. The scrambling patterns are set so as to establish an orthogonal or pseudo orthogonal relation with respect to each other. According to this frame structure, since the pilot signal transmitted from a certain transmitter is in an orthogonal or pseudo orthogonal relation with signals transmitted from other transmitters, the receiver side is able to separate the signal transmitted from the certain transmitter from the signals from other transmitters. Accordingly, the pilot signal can be used for channel estimation of signals which do not adapt macro diversity reception.

To perform macro diversity reception for the signals transmitted in the frame structure, a two-step process is required at the receiver. In the first step, each channel response from each transmitter to receiver is estimated individually using the orthogonal or pseudo orthogonal relation. In the second step, the sum of each individually estimated channel response is used to compensate channel distortion of the received data signal by equalization, i.e. channel equalization. In this manner, channel equalization can be carried out for data signals arriving from each transmitter via each channel to the receiver.

For the receiver side to perform macro diversity reception for the signals of the frame structure, it is necessary to estimate each channel response from each transmitter to receiver individually. Originally, only the sum of each channel response is required for channel equalization in macro diversity reception. However, in the frame structure, it is necessary to obtain each channel response individually for channel equalization, which, consequently, increases the calculation amount.

Meanwhile, in the process of estimating each channel response individually, a desired channel response can be taken out alone by canceling out the other channels using the orthogonal or pseudo orthogonal relation. However, in some cases, channel distortion may weaken the orthogonality or the pseudo orthogonality, and the effectiveness to cancel out other channel responses may be reduced. In such case, the other channel responses are subject to complex addition as interference on the desired channel response, deteriorating accurate estimation of the desired channel response.

Further, in the process of estimating each channel response individually, the receiver is required to recognize all scrambling patterns included in the received signal. In the case where the receiver does not recognize a part of the scrambling pattern, the receiver will not be able to estimate the channel response from the transmitter to the receiver, and the reception performance deteriorates. Moreover, when the receiver recognizes a scrambling pattern not included in the received signal by mistake, the estimate value of a channel response generated by such scrambling pattern only includes interference. Thus, again, the reception performance deteriorates. For the receiver side to recognize the scrambling pattern, it is necessary to control information on which signal corresponding to which scrambling pattern is being received at the receiver side. Therefore, the control of the receiving side becomes complicated.

BRIEF SUMMARY OF THE INVENTION

Accordingly, an object of the present invention is to provide a method of transmitting OFDM signals and a transmitter and a receiver thereof, which provide small amount of calculation, less deterioration in the accuracy of channel estimation caused by interference, and are simple to control in the case of performing macro diversity reception at the receiver side.

According to an aspect of the present invention, there is provided a method of transmitting OFDM signals comprising; allocating a first pilot signal and a first data signal which are both common among OFDM transmitters respectively to at least one first pilot subcarrier and first data subcarriers within a specific time-frequency domain that is common among the OFDM transmitters and different among wireless transmitting units; allocating a second pilot signal and a second data signal respectively to at least one second pilot subcarrier and second data subcarriers outside the time-frequency domain; multiplying the first pilot signal and the first data signal by a complex number set for the time-frequency domain; generating an OFDM signal by performing OFDM modulation on the first pilot signal and the first data signal multiplied by the complex number and the second pilot signal and the second data signal; and transmitting the OFDM signal.

BRIEF DESCRIPTION OF THE SEVERAL VIEWS OF THE DRAWING

FIG. 13 illustrates the second subcarrier group setting method.

FIG. 14 illustrates an allocation method of pilot subcarriers within the subcarrier group.

FIG. 21 illustrates receiving performance of the allocation methods of FIGS. 17 and 19.

FIG. 23 illustrates an example of a cellular system including a plurality of cells which are respectively configured with a plurality of sectors.

FIG. 28 is a block diagram showing a third example of the OFDM transmitter in FIG. 1.

FIG. 30 is a block diagram showing a fourth example of the OFDM transmitter in FIG. 1.

DETAILED DESCRIPTION OF THE INVENTION

Figure 1:
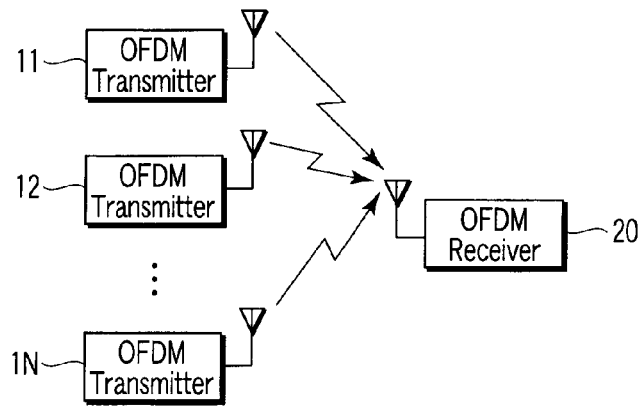
FIG. 1 is a schematic view of an OFDM wireless system according to an embodiment.

As shown in FIG. 1, the wireless communication system according to a first embodiment of the present invention includes a plurality (N) of OFDM transmitters 11, 12, . . . , 1N and an OFDM receiver 20 which receives OFDM signals transmitted from each OFDM transmitter 11, 12, . . . , 1N via different channel propagation paths. Each of the OFDM transmitters 11, 12, . . . , 1N transmits OFDM signals. The OFDM transmitters 11, 12, . . . , 1N need not necessarily be placed in different places from one another. Therefore, some of them may be placed in the same place. For example, two of the OFDM transmitters may be included in one wireless communication apparatus. In such case, common components among the transmitters, such as a subcarrier allocation unit and subcarrier group setting unit, which are a part of the components in the OFDM transmitter, may be shared among a plurality of OFDM transmitters. The subcarrier allocation unit and subcarrier group setting unit will be explained later.

First Example of the OFDM Transmitter

Figure 2:
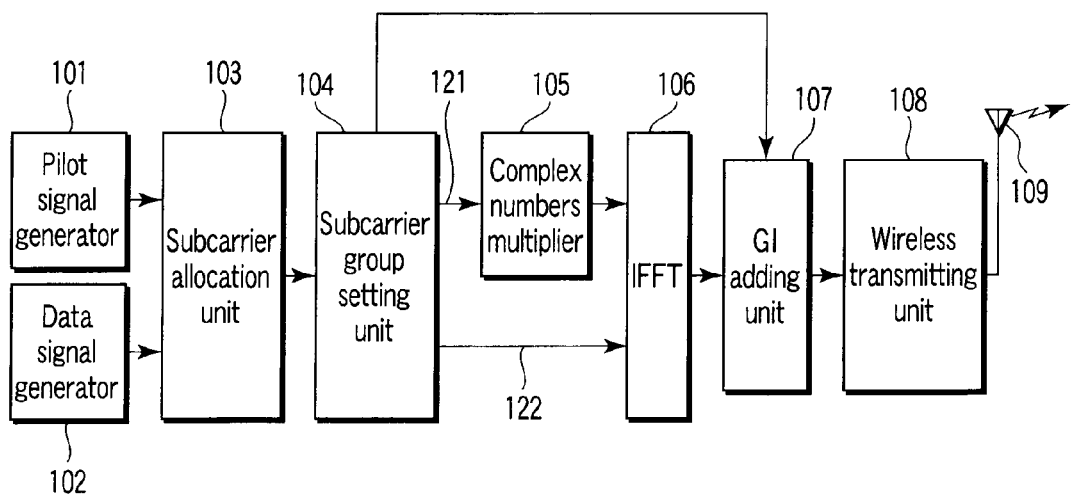
FIG. 2 is a block diagram showing an example of an OFDM transmitter in FIG. 1.
Figure 3:
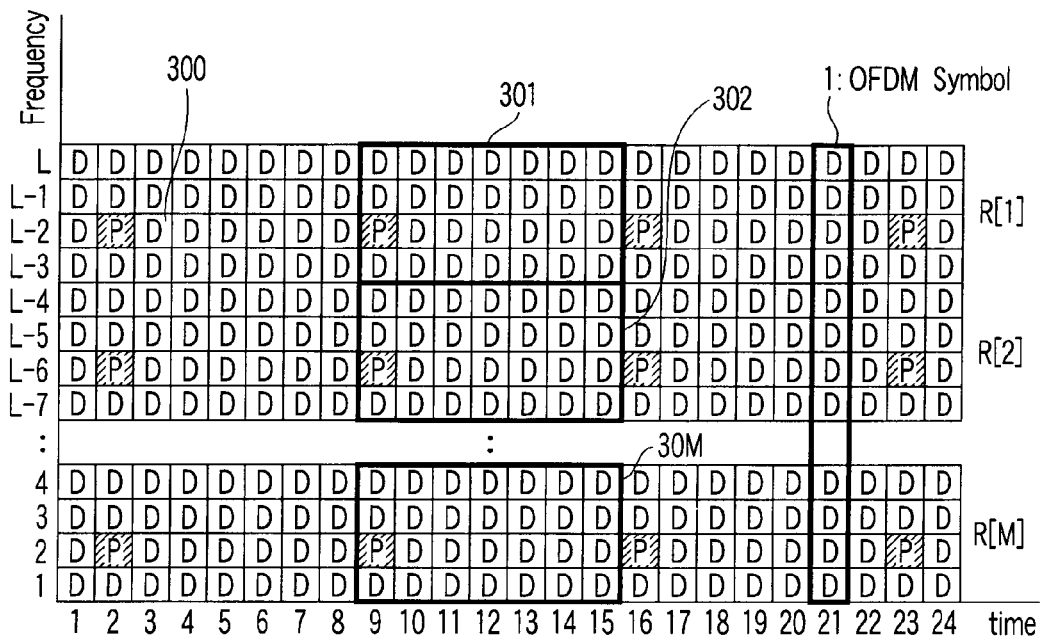
FIG. 3 illustrates the setting of subcarrier allocation and subcarrier group in the OFDM transmitter.

FIG. 2 shows the structure of an OFDM transmitter. FIG. 3 shows the aspects of a subcarrier allocation unit 103 allocating subcarriers and a subcarrier setting unit 104 setting subcarrier groups. In FIG. 3, OFDM symbols are arranged along a horizontal time axis, and a plurality of subcarriers forming each OFDM symbol is arranged along a vertical frequency axis. 1, 2, . . . , M specified along the frequency axis represent subcarrier numbers. 1, 2, . . . , specified along the time axis represent OFDM symbol numbers.

In FIG. 2, a pilot signal generator 101 generates a pilot signal by subjecting a bit string which is the source of the pilot signal to digital modulation, such as quadrature phase shift keying (QPSK). Similarly, a data signal generator 102 generates a data signal by subjecting a bit string which is the source of the data signal to digital modulation such as QPSK. Both the pilot signal and data signal are shown in complex numbers. Further, the pilot signal is used, for example, for channel estimation (estimating channel response). The pilot signal can also be used for timing synchronization or frequency synchronization. The following embodiment explains the case of using the pilot signal for channel estimation.

The generated pilot signal and data signal are allocated to each corresponding subcarrier, i.e. to pilot subcarriers and data subcarriers, by the subcarrier allocation unit 103. To "allocate a signal to a subcarrier" means to add a subcarrier index to the signals shown in complex numbers. The subcarrier index represents the position of the corresponding subcarrier on the time axis and frequency axis. For example, a subcarrier index (3, L-2) is added to a data signal 300 in FIG. 3.

The pilot signal and data signal each allocated to the pilot subcarriers and data subcarriers by the subcarrier allocation unit 103 is input to the subcarrier group setting unit 104. The subcarrier group setting unit 104 sets up at least one subcarrier group including at least one or more pilot subcarriers to which the pilot signals are allocated and one or more data subcarriers to which the data signals are allocated. In the example of FIG. 3, a plurality (M) of subcarrier groups 301, 302, . . . , 30M are set. To "set a subcarrier group" means to add an index (referred to as group index) to the pilot signals and data signals to which the subcarrier indexes are added. The group index is not added to signals which do not belong to any subcarrier group.

Here, the subcarrier group setting unit 104 sets up at least one subcarrier group identical among the transmitters for the OFDM transmitters 11, 12, . . . , 1N in FIG. 1. In other words, at least one subcarrier group set up by each of the subcarrier setting units 104 in the OFDM transmitters 11, 12, . . . , 1N is in common. In the common subcarrier group, the pilot signals and data signals common to each OFDM transmitter 11, 12, . . . , 1N are allocated to the pilot subcarriers and data subcarriers respectively. As the OFDM transmitters 11, 12, . . . , 1N assume a macro diversity reception, the common pilot signals and common data signals here include, for example, signals having undergone identical processes for identical signals. For example, the common data signals here also include, identical data signals having undergone identical scrambling or identical scaling.

Signals 121 which are allocated to the subcarriers within the subcarrier group set up by the subcarrier group setting unit 104, i.e., the pilot signal (a first pilot signal) and data signal (a first data signal) to which group indexes have been added, are input to an inverse fast Fourier transformation (IFFT) unit 106, which is an OFDM modulator, via a complex numbers multiplier 105. Signals 122 allocated to subcarriers outside the subcarrier group, i.e., the pilot signal (a second pilot signal) and data signal (a second data signal) to which the group indexes are not added, are input directly to an IFFT unit 106.

The complex numbers multiplier 105 multiplies the pilot signal and data signal, to which group indexes are added, by complex numbers or sequence of complex numbers given to each pilot signal and data signal in equivalent group indexes. In the example of FIG. 3, each of the subcarrier groups 301, 302, . . . , 30M is multiplied respectively by one complex number R [1], R[2], . . . , R[M]. The complex numbers given to each subcarrier group may all have the same absolute value. By doing so, the occurrence of electric power differences can be circumvented among the subcarrier groups. Here, the complex numbers comprise a real value, which can be, for example, ±1. The pilot signal and data signal multiplied by the complex numbers are input to the IFFT unit 106.

The IFFT unit 106 generates an OFDM signal which is the sequence of a plurality of OFDM symbols by subjecting the signals input from the subcarrier group setting unit 104 and the complex numbers multiplier 105 to OFDM modulation. In other words, the IFFT unit 106 generates the OFDM signal by converting the signal of a frequency domain to the signal of a time domain. The generated OFDM signal is appended a guard interval (GI) by a GI adding unit 107, converted into a radio frequency (RF) signal by a wireless transmitting unit 108 which includes, for example, a digital to analog converter, an up-converter and a power amplifier, and transmitted from an antenna 109. The length of the guard interval added by the GI adding unit 107 is set in accordance with the instruction from the subcarrier group setting unit 104, as described later.

First Example of the OFDM Receiver

Figure 4:
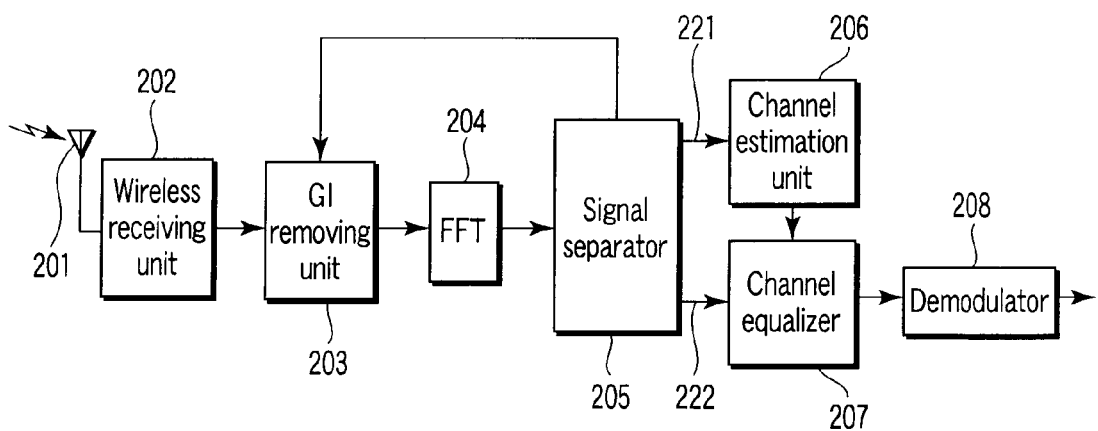
FIG. 4 is a block diagram showing an example of an OFDM receiver in FIG. 1.

The OFDM receiver 20 in FIG. 1 will be explained using FIG. 4. FIG. 4 shows a structure related to the macro diversity reception of the OFDM receiver 20. The RF signal received by an antenna 201 is converted into a baseband digital signal by a wireless receiving unit 202 which includes, for example, a low-noise amplifier (LNA), a down-converter and an analog to digital converter. After the guard interval is removed from the baseband digital signal by a GI removing unit 203, the baseband digital signal is converted into a frequency domain signal from a time domain signal, i.e., divided into signals of each subcarrier, by a fast Fourier transformation (FFT) unit 204. The output signal from the FFT unit 204 is input to a signal separator 205. An OFDM demodulator includes the GI removing unit 203 and the FFT unit 204.

The signal separator 205 separates the pilot signal 221 and data signal 222 which are respectively allocated to the subcarriers within the subcarrier group. The separated pilot signal 221 and data signal 222 are respectively input to a channel estimation unit 206 and a channel equalizer 207. The channel estimation unit 206 carriers out channel estimation by averaging or interpolating the pilot signal 221 for each subcarrier group, and outputs a channel estimation value indicating channel response. The channel equalizer 207 equalizes the channel for the data signal 222 using the channel estimation value output from the channel estimation unit 206. The data signal obtained after channel equalization is demodulated by a demodulator 208, and a bit string which is the source of the data signal is reproduced.

The operation of channel estimation unit 206 will be explained in detail. For simplification, the widths of the time direction and the frequency direction of the subcarrier group are assumed to be sufficiently smaller than the variation cycle of the channel time direction and frequency direction, respectively. In such case, the channel response for the signal allocated to the subcarriers within the subcarrier group can be regarded as almost constant. As explained in FIG. 2, all pilot signals and data signals allocated to each subcarrier within the subcarrier group set by the subcarrier group setting unit 104 are multiplied by coefficient numbers given with respect to each subcarrier group. When R represents coefficient numbers and H represents channel response, the pilot signal and data signal allocated to each subcarrier within the same subcarrier group mutually undergoes a distortion represented by H*R. As a result, this can be regarded equivalent to the OFDM signal transmitted from the OFDM transmitter receiving a channel response represented by H*R.

In other words, even in the case where each OFDM transmitter 11, 12, . . . , 1N transmits signals respectively multiplied by different complex numbers, allocated to subcarriers within the same subcarrier group, the OFDM receiver 20 can handle them likewise the case where the signals are transmitted without being multiplied by complex numbers. Accordingly, independent of the complex numbers multiplied in the OFDM transmitters 11, 12, . . . , 1N, the channel estimation unit 206 can obtain a channel estimation value by dividing the received pilot signal by the original pilot signal. The original pilot signal is a given signal in the OFDM receiver.

When a plurality of pilot subcarriers exist within the subcarrier group, a highly accurate channel estimation value can be obtained by averaging the value obtained by dividing the pilot signal allocated to each of the pilot subcarriers by the original pilot signal. Further, when a plurality of pilot subcarriers are arranged apart from each other within the subcarrier group, a highly accurate channel estimation value can be obtained by interpolating the gap using a value obtained by dividing the pilot signal allocated to each pilot subcarrier by the original pilot signal.

The process of channel estimation and channel equalization with respect to the data subcarriers within the subcarrier group will be explained using the following equation. In the following explanation, a certain data signal is represented as D, the pilot signal allocated to the pilot subcarriers within the subcarrier group is represented as P, and the complex numbers by which the pilot signal and data signal allocated to the subcarriers within the subcarrier group at the nth OFDM transmitter 1n are multiplied is represented as Rn.

In addition, for simplification, the channel distortion received by the pilot signal and data signal allocated to the subcarriers within the subcarrier group can be regarded as constant, and the channel distortion of the channel between the OFDM transmitter in and the OFDM receiver 20 is represented by 1n.

In this case, the pilot signal and data signal transmitted from the OFDM transmitter 1n are given by $P \cdot R_n$ and $D \cdot R_n$, respectively. The $P \cdot R_n$ and $D \cdot R_n$ are subject to complex addition by the antenna 201 of the OFDM receiver after receiving channel distortion. The received pilot signal $R_{rx}$ is described as the next equation.

$$P_{rx} = P \cdot \sum_{n=1}^{N} (R_n \cdot H_n) \quad (1)$$

However, N represents the number of OFDM transmitters.

Meanwhile, the received data signal $D_{rx}$ is described as the following equation.

$$D_{rx} = D \cdot \sum_{n=1}^{N} (R_n \cdot H_n) \quad (2)$$

In this case, as shown in the following equation, the data signal D can be restored by multiplying the data signal $D_{rx}$ by the inverse number of the received pilot signal $P_{rx}$ and the given original pilot signal P.

$$D_{rx} \times \frac{P}{P_{rx}} = D \times \sum_{n=1}^{N} (R_n \times H_n) \times \frac{1}{\sum_{n=1}^{N} (R_n \times H_n)} \quad (3)$$
$$= D$$

Meanwhile, according to the method shown in R1-051300, "MBMS transmission in E-UTRA", LG Electronics, 3GPP TSG RAN WG1# 43, Nov. 7-11, 2005, data signal is not multiplied by complex numbers at the transmitter. Therefore, the received pilot signal $P_{rx}$ becomes, $$P_{rx} = P \cdot \sum_{n=1}^{N} (R_n \cdot H_n) \quad (4)$$

and the received data signal $D_{rx}$ becomes, $$D_{rx} = D \cdot \sum_{n=1}^{N} (H_n) \quad (5)$$

In this case, as shown in the following equation, it is obvious that the original data signal D will not be restored even if multiplying the data signal by the inverse number of the received pilot signal and P.

$$D_{rx} \cdot \frac{P}{P_{rx}} = D \cdot \sum_{n=1}^{N} (H_n) \cdot \frac{1}{\sum_{n=1}^{N} (R_n \cdot H_n)} \quad (6)$$
$$= D \cdot \frac{\sum_{n=1}^{N} (H_n)}{\sum_{n=1}^{N} (R_n \cdot H_n)}$$

To restore the original data signal D, a process to calculate $$\sum_{n=1}^{N} (H_n) \quad (7)$$

is required based on estimating each $H_n$ individually. As described earlier, in the process of estimating each Hn individually, interference may be added in some cases. In such case, the accuracy of the channel estimation value deteriorates.

The above describes the method to restore the original data signal by multiplying the received data signal by the inverse number of the received pilot signal and P. However, some other methods are described as follows.

When placing $H_{comb}$ as $$H_{comb} = \frac{P_{rx}}{P} = \sum_{n=1}^{N} (R_n \cdot H_n) \quad (8)$$

a data signal can be restored by multiplying the received data signal by the complex conjugate of $H_{comb}$ and the inverse number of the absolute value of $H_{comb}$ as shown in the following equation.

$$D_{rx} \cdot \frac{(H_{comb})^*}{|H_{comb}|} = D \cdot H_{comb} \cdot \frac{(H_{comb})^*}{|H_{comb}|} \quad (9)$$
$$= D \cdot \frac{|H_{comb}|^2}{|H_{comb}|}$$
$$= D \cdot |H_{comb}|$$

However, in this case, as the amplitude is shifted by $|H_{comb}|$, the modulation point to be compared upon demodulation also needs to be shifted by $|H_{comb}|$.

As mentioned above, according to the present embodiment, when carrying out macro diversity reception by the OFDM receiver 20 for the signals transmitted from the OFDM transmitters 11, 12, ..., 1N, calculation amount can be reduced since there is no need to estimate each channel response individually from each OFDM transmitter 11, 12, ..., 1N to the OFDM receiver 20. In other words, as described in equation (3), the original data signal D can be restored by simply multiplying the received data signal $D_{rx}$ by the inverse number of the received pilot signal $P_{rx}$ and the original pilot signal P. Further, it is possible to avoid interference problems which occur upon estimating each channel response individually. Moreover, it will become unnecessary to control management of the scrambling pattern to estimate each channel response individually.

Second Example of the OFDM Transmitter

Other examples of the OFDM transmitter and OFDM receiver will be explained. In the OFDM transmitter shown in FIG. 5, a scrambler 110 is added to the OFDM transmitter shown in FIG. 2. The scrambler 110 scrambles a signal 122 which is allocated to subcarriers not included in the subcarrier group set by the subcarrier setting unit 104, i.e. pilot signals and data signals to which a group index is not added. The scramble is carried out by a scrambling pattern different among each OFDM transmitter. The scrambled signal is input to an IFFT unit 106.

Second Example of the OFDM Receiver

Figure 5:
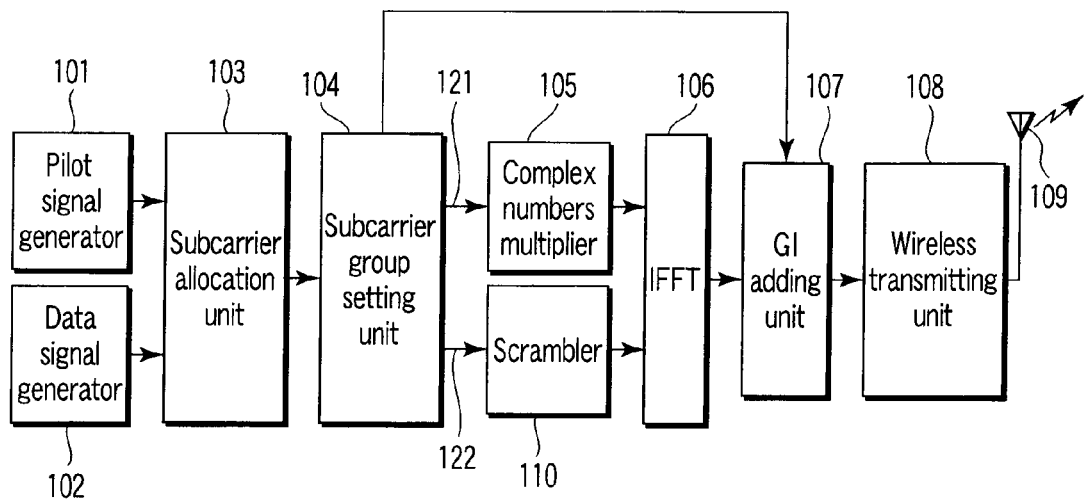
FIG. 5 is a block diagram showing another example of the OFDM transmitter in FIG. 1.
Figure 6:
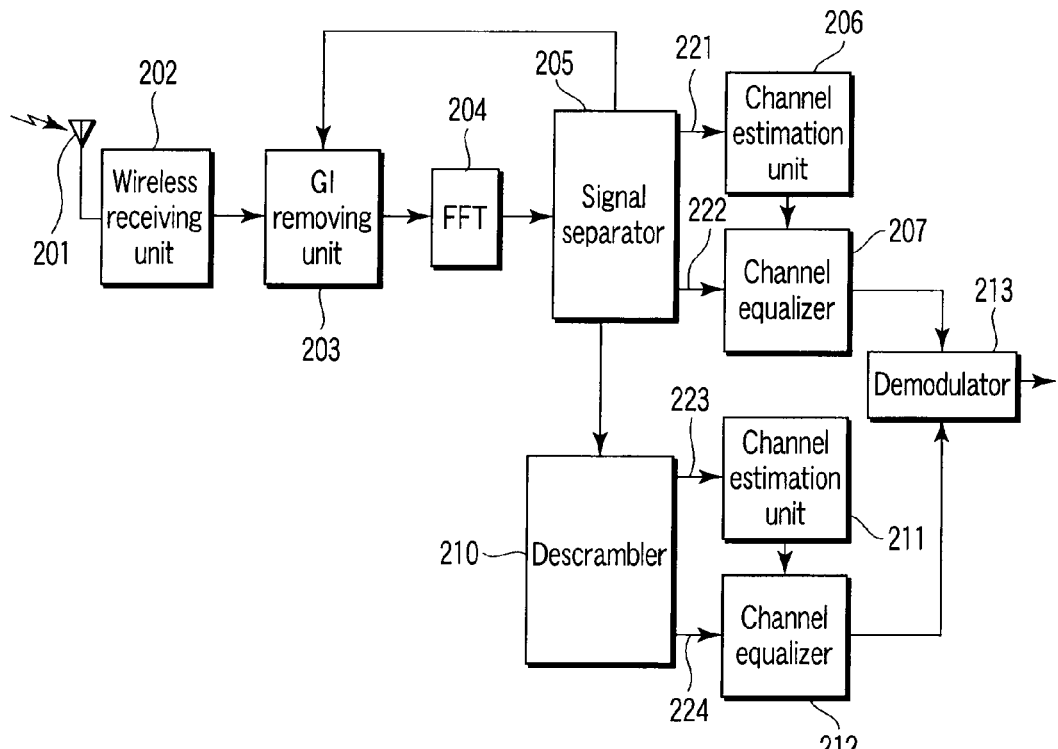
FIG. 6 is a block diagram showing another example of the OFDM receiver in FIG. 1.

FIG. 6 is an OFDM receiver corresponding to FIG. 5. It shows that a descrambler 210, a second channel estimation unit 211 and a second channel equalizer 212 are added to the OFDM receiver in FIG. 4. The signals allocated to subcarriers within the subcarrier group are processed in the same manner as in the OFDM receiver shown in FIG. 4. In other words, pilot signals 221 and 222 allocated to subcarriers within the subcarrier group and output from the signal separator 205 are input respectively to the channel estimation unit 206 and the channel equalizer 207. The channel equalizer 207 equalizes the data signal 222 using a channel estimation value output from the channel estimation unit 206. The data signal undergone channel equalization by the channel equalizer 207 is demodulated by a demodulator 213, and a bit string being the source of the data signal is reproduced thereby.

Meanwhile, the descrambler 210 descrambles the pilot signal and data signal allocated to subcarriers not included in the subcarrier group and output from the signal separator 205. The descrambler 210 performs descrambling by an inverse scramble pattern of the scramble pattern used by an OFDM transmitter which transmits signals to be received by the OFDM receiver. The pilot signal 223 and data signal 224 descrambled by the descrambler 210 are respectively input to the channel estimation unit 211 and the channel equalizer 212.

The channel estimation unit 211 estimates the channel by averaging and interpolating adjacent pilot signals, and calculates the channel estimation value which indicates a channel response. The channel equalizer 212 carries out channel equalization for the descrambled data signal using the channel estimation value output from the channel estimation unit 211. The data signal undergone channel equalization by the channel equalizer 212 is input to the demodulator 213, whereby a bit string being the source of the data signal is reproduced.

The averaging process carried out by the channel estimation unit 211 is able to reduce the power of the pilot signal which is transmitted from OFDM transmitters having different scrambling patterns and improve the accuracy of a desired channel estimation value.

In this manner, each OFDM transmitter uses different scrambling patterns to scramble signals allocated to subcarriers not included in the subcarrier group, i.e., signals not subject to macro diversity reception by the OFDM receiver 20. By doing so, a highly accurate channel estimation value can be obtained upon ordinary, but not a macro diversity, reception. Further, the scrambling pattern may be determined in advance between the transmitter and receiver. Alternatively, the OFDM receiver 20 may be notified of the transmission of a scrambling pattern from the OFDM transmitter (such as, OFDM transmitter 11) upon initiating a communication with the OFDM transmitter 11. As scrambling is carried out for signals not subject to macro diversity reception, the OFDM receiver 20 needs not know the scrambling patterns for all OFDM transmitters.

As can be comprehended from the above explanations, among the signals allocated to subcarriers not included in the subcarrier group, data signals need not necessarily undergo scrambling. Accordingly, the scrambler 110 in FIG. 5 may scramble only the pilot signal. In such case, the descrambler 210 in FIG. 6 descrambles only the pilot signal.

Setting Method of Subcarrier Group

A more specific setting method of the subcarrier group will be explained using FIGS. 7 to 16 and FIGS. 22A and 22B.

As mentioned above, the subcarrier group is set to include at least one pilot subcarrier and one data subcarrier. In the following description, a specific example of the subcarrier group setting method is illustrated by citing the case of a cycle where one pilot subcarrier is inserted for every four subcarriers on the frequency axis and one pilot subcarrier is inserted for every seven subcarriers on the time axis. In the following explanation, an OFDM symbol represents a unit of OFDM signals generated by performing one IFFT. A plurality of subcarriers is included in one OFDM symbol. In FIGS. 7 to 16 and FIGS. 22A and 22B, the frequency axis indicates a subcarrier number within one OFDM symbol, and the time axis indicates the OFDM symbol number.

First Subcarrier Group Setting Method

Figure 7:
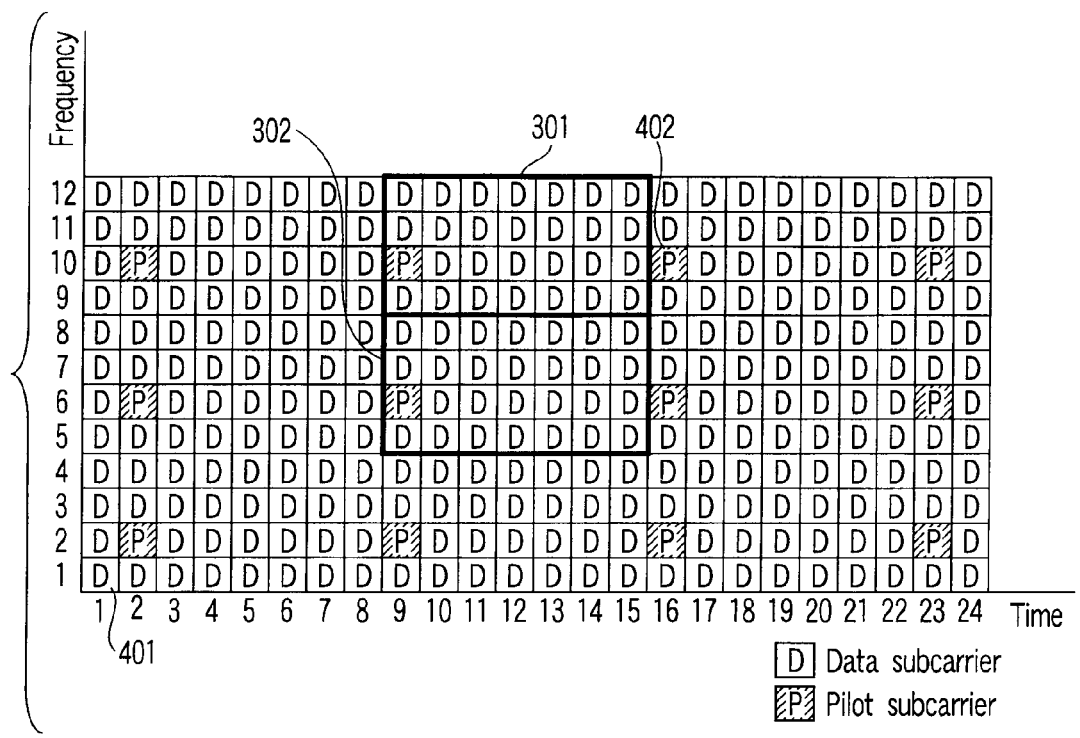
FIG. 7 illustrates a first subcarrier group setting method.

According to a first subcarrier group setting method, a subcarrier group is set up by subcarriers within a particular domain (rectangular time-frequency domain) sectioned in quadrate by the time axis and frequency axis. In other words, a subcarrier group is set up by subcarriers (pilot subcarriers and data subcarriers) comprised in a plurality of successive OFDM symbols. For instance, the example of FIG. 7 can be represented in the following equation. In FIG. 7, a position on the frequency axis is referred to as "i", and the position on the time axis is referred to as "j". Therefore, the position of a subcarrier 401 is referred to as (i, j)=(1, 1), and the signal allocated to the subcarrier of position (i, j) is referred to as $S_{i,j}$. The signals allocated to subcarriers within a subcarrier group 301 are multiplied by complex numbers referred to as R[1], and a subcarrier group 302 is multiplied by the complex numbers referred to as R[2]. The following equation shows the process of multiplying each subcarrier group by a complex number.

$$S_{i,j} \cdot R(i, j) \qquad (10)$$

$$R(i, j) = \begin{cases} R[\lfloor (i-1)/4 \rfloor] & (9 \le j \le 15 \text{ and } 5 \le i \le 12) \\ 1 & \text{(other)} \end{cases}$$

Figure 8:
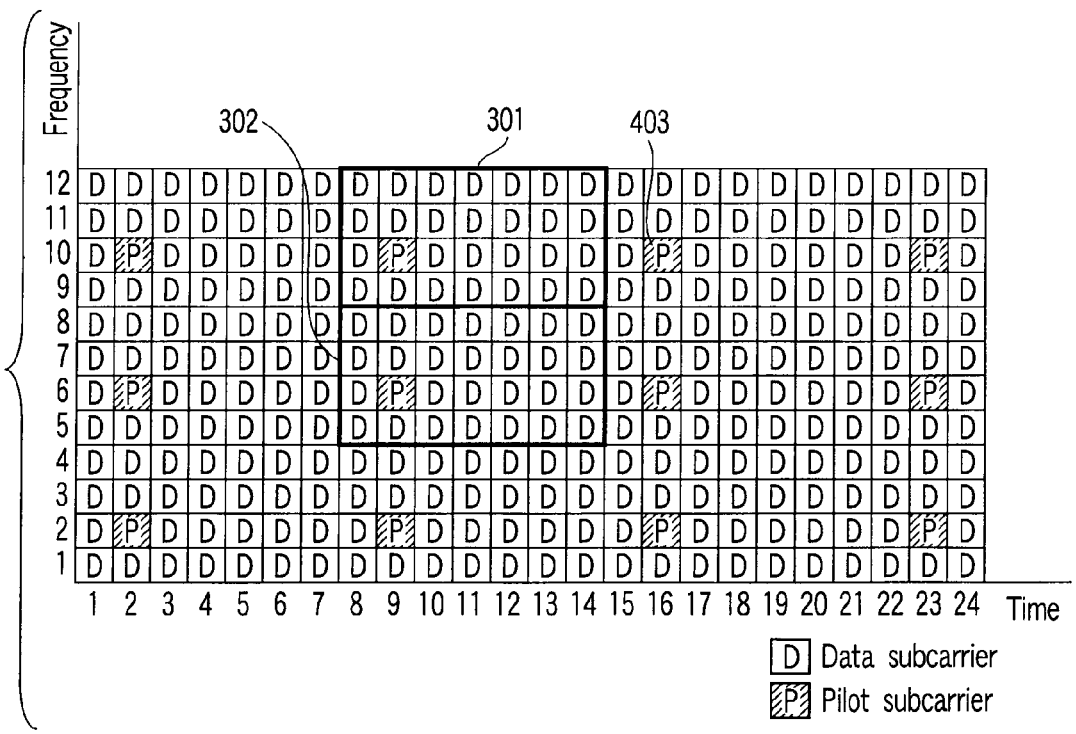
FIG. 8 illustrates the first subcarrier group setting method.
Figure 9:
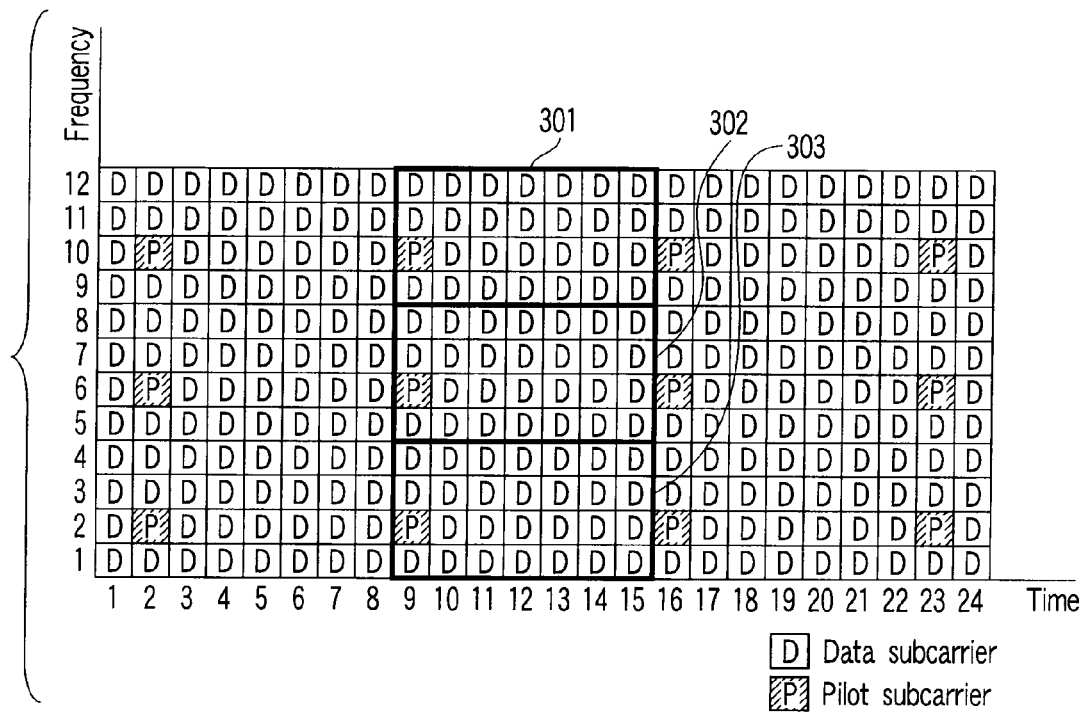
FIG. 9 illustrates the first subcarrier group setting method.

According to the first subcarrier group setting method, in the case where boundaries are defined in constant subcarrier intervals on the frequency axis and time axis, there is an advantage that the subcarriers can be readily arranged in a way that the subcarrier group does not cross such boundaries. For example, when forming one frame with a 7OFDM symbol, quadrangle subcarrier groups 301 and 302, or subcarrier groups 301, 302 and 303 are set in the size of 4 subcarriers in the frequency direction and 7 subcarriers in the time direction as shown in FIGS. 7, 8 and 9. Herewith, it is possible to generate a subcarrier group without crossing the frame boundary, which includes one pilot subcarrier for every subcarrier group.

Figure 10:
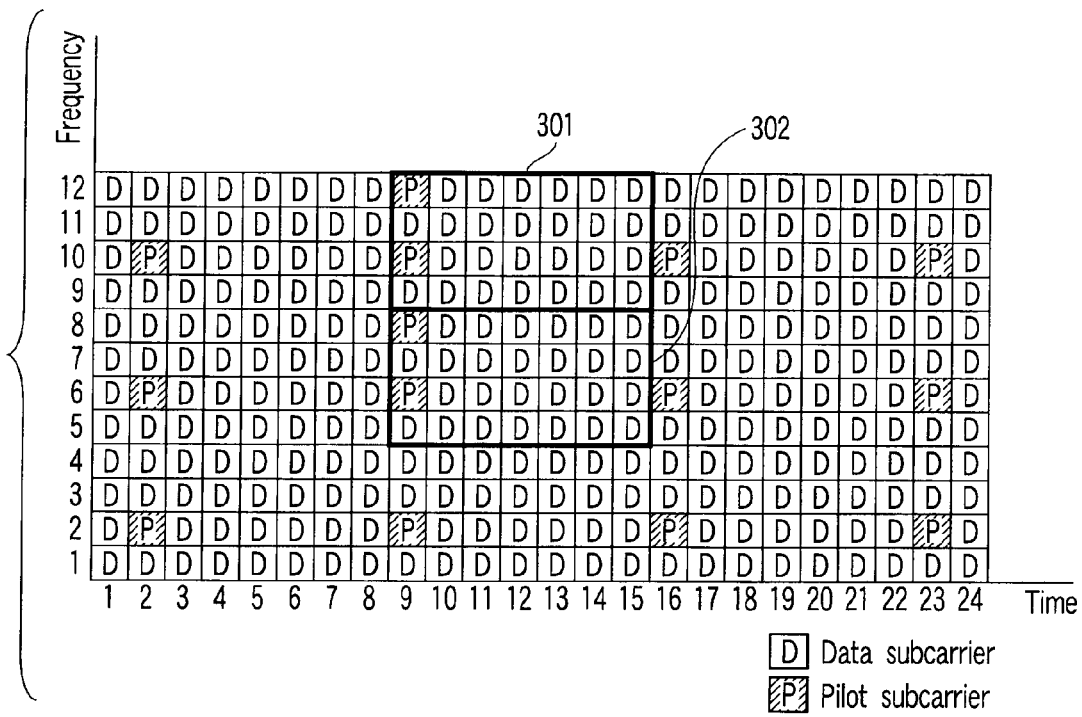
FIG. 10 illustrates the first subcarrier group setting method.

FIGS. 7 and 8 show examples in the case where each frame boundary is positioned in the seventh and sixth position counting from an OFDM symbol with a pilot subcarrier. FIG. 9 shows an example of paving the subcarrier groups 301, 302 and 303 in the frequency direction, i.e., arranging the subcarrier groups 301, 302 and 303 successively across the entire length of the OFDM symbol, in a certain time zone. According to the example of FIG. 9, all subcarriers in such time zone belong to any one of the subcarrier groups 301, 302 and 303. Accordingly, the OFDM receiver is able to perform macro diversity reception for any of the subcarriers during such time zone. FIG. 10 shows an example of increasing the density of the pilot subcarriers within the subcarrier groups 301 and 302 compared to that outside the subcarrier groups. According to the example of FIG. 10, the receiving performance of the data subcarriers within the subcarrier group can be improved.

Second Subcarrier Group Setting Method

In a second subcarrier group setting method, a subcarrier group is set by the combination of subcarriers (pilot subcarriers and data subcarriers) within a quadrate time-frequency domain and at least one pilot subcarrier arranged outside the quadrate domain, where such pilot subcarrier is arranged in the same frequency axis but on a different time axis from at least one pilot subcarrier or data subcarrier within these quadrate domains. In other words, the subcarrier group is set by subcarriers (pilot subcarriers and data subcarriers) included in a plurality of consecutive OFDM symbols and a pilot subcarrier which has a frequency equivalent to at least one pilot subcarrier or data subcarrier included in the plurality of consecutive OFDM symbols and is included in at least one OFDM symbol close to the plurality of consecutive OFDM symbols.

Figure 11:
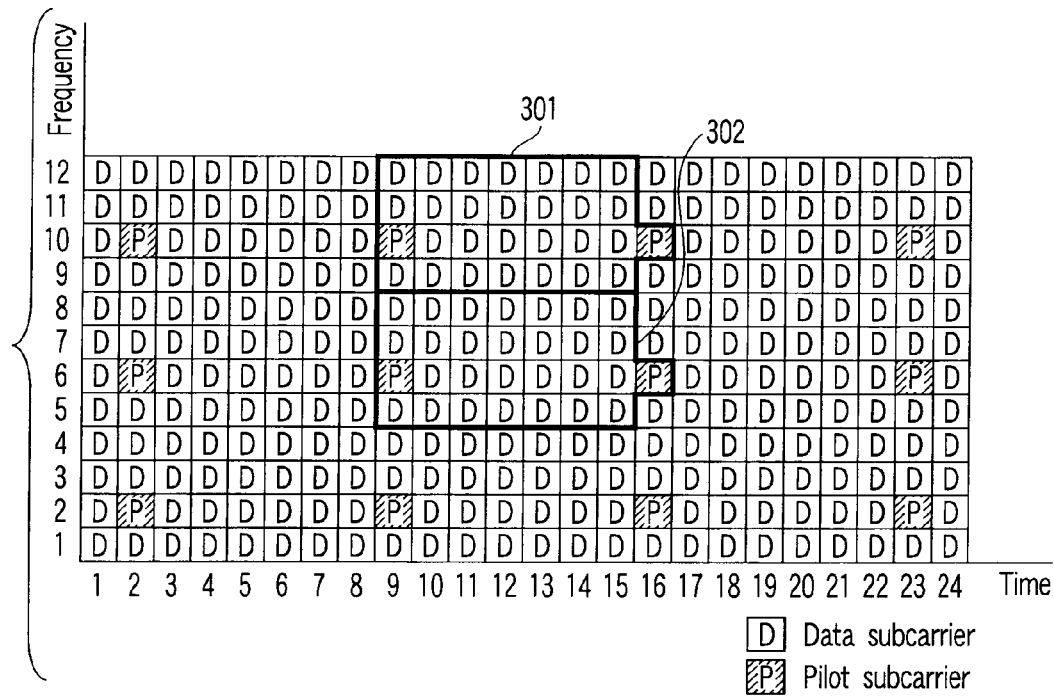
FIG. 11 illustrates a second subcarrier group setting method.
Figure 12:
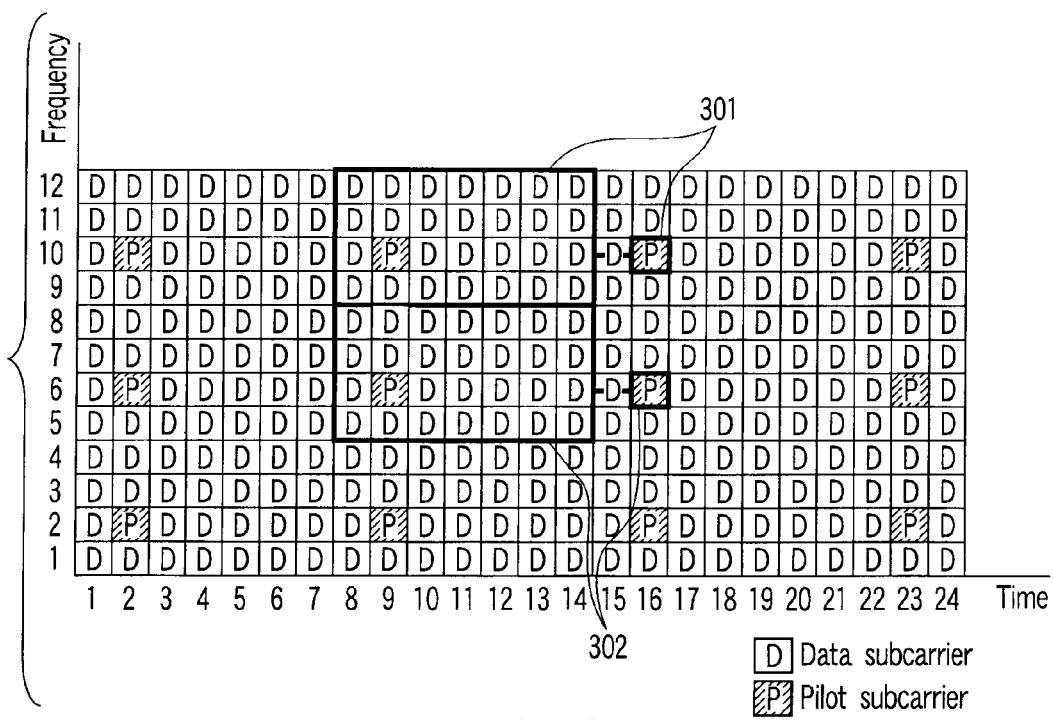
FIG. 12 illustrates the second subcarrier group setting method.

For example, FIG. 11 shows subcarrier groups 301 and 302 each including a pilot subcarrier positioned in the same frequency axis as the pilot subcarriers within the subcarrier group (quadrant domain) shown in FIG. 7 and close to the right side of the quadrant. Similarly, FIG. 12 shows subcarrier groups 301 and 302 each including a pilot subcarrier positioned in the same frequency axis as the pilot subcarriers within the subcarrier group (quadrant domain) shown in FIG. 8 and close to the right side of the quadrant domain. Further, FIG. 13 shows subcarrier groups 301 and 302 each including two pilot subcarriers before and after the subcarrier group in FIG. 11.

According to the second subcarrier group setting method, it can facilitate estimation of the time domain variation of channel response for channel estimation carried out for each subcarrier group. Accordingly, it has the advantage of being able to improve the accuracy of channel estimation in the case where this variation is large.

In the case of applying the second subcarrier group setting method to the OFDM transmitter shown in FIG. 5, the range of the subcarrier group may be interpreted differently. In the OFDM transmitter shown in FIG. 5, scrambling is performed on the signal allocated to subcarriers outside the subcarrier group. When the signals allocated to the subcarriers within the subcarrier group 301 in FIG. 7 are multiplied by the complex numbers identical to the complex numbers used to scramble the pilot signal allocated to the pilot subcarrier 402, the subcarrier groups in FIG. 7 and FIG. 11 can be considered identical.

Similarly, when the signals allocated to the subcarriers within the subcarrier group 301 in FIG. 8 are multiplied by the complex numbers identical to the complex numbers used to scramble the pilot signal allocated to the pilot subcarrier 403, the subcarrier group in FIG. 8 can be regarded as equivalent to the subcarrier group in FIG. 12.

In such manner, by multiplying the signals allocated to subcarriers within the subcarrier group by complex numbers identical to the complex numbers used to scramble the pilot signal allocated to the subcarriers outside the subcarrier group, the pilot signal allocated to the subcarriers outside the subcarrier group can be identified as equivalent to the pilot signals allocated to subcarriers within the subcarrier group. Accordingly, it is possible to improve the accuracy of channel estimation of the channel corresponding to the subcarrier group.

The shape of the subcarrier group need not necessarily be a complete quadrate. For example, the quadrate may be formed by excluding less than half of the entire subcarriers within the subcarrier group. By doing so, a subcarrier group with higher flexibility can be designed. When it is required to further enhance flexibility of the subcarrier group, the subcarriers within the subcarrier group need not necessarily be formed in a shape close to a quadrate. In such case, for example, at least the data subcarriers within the subcarrier group can be arranged successively in the frequency direction or the time direction. This may facilitate channel equalization due to the rise in correlation of channel distortion between data subcarriers within the subcarrier group.

Allocation Method 1 of Pilot Subcarriers

Figure 15:
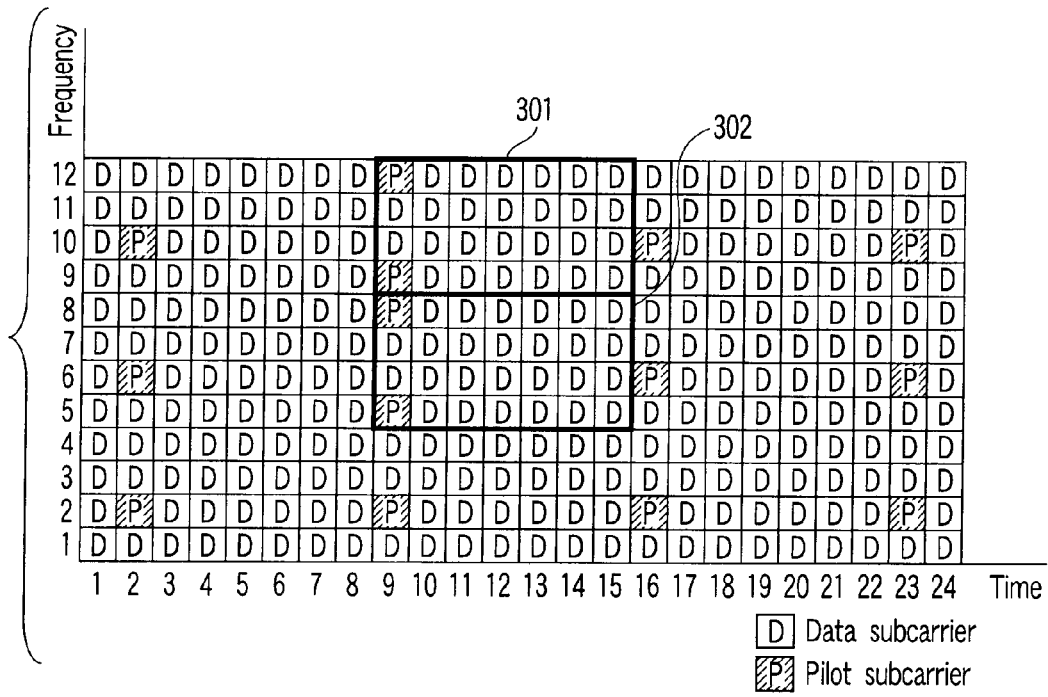
FIG. 15 illustrates the allocation method of the pilot subcarriers within the subcarrier group.
Figure 16:
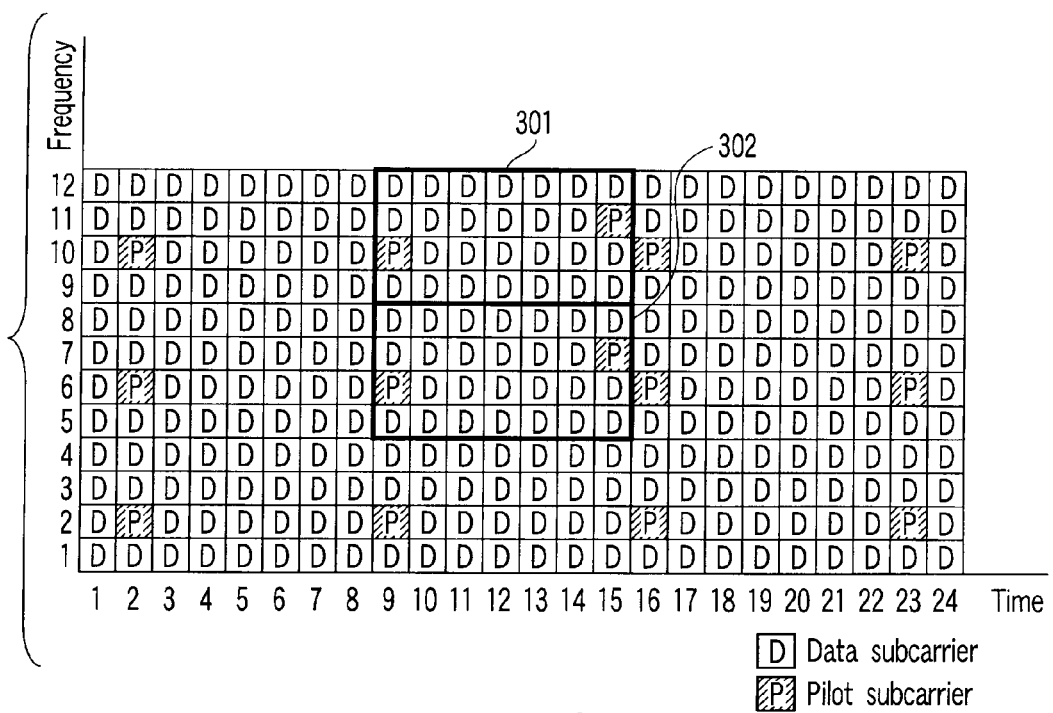
FIG. 16 illustrates the allocation method of the pilot subcarriers within the subcarrier group.

A specific example of a layout method of the pilot subcarriers within the subcarrier group will be shown using FIGS. 14, 15 and 16. In the example shown in FIG. 14, the pilot subcarriers within the subcarrier group are arranged uniformly dispersed in the time direction and frequency direction. By dispersing the pilot subcarriers within the subcarrier group in such way, channel estimation can be performed in compliance with the variation of both the time direction and frequency direction of the channel response.

In the example of FIG. 15, pilot subcarriers are arranged preferentially on both ends of the frequency direction within the subcarrier group. When the variation is significant in the frequency direction of the channel response, the variation of the channel response will be estimated using the pilot signals allocated to the subcarriers within the subcarrier group. When carrying out channel estimation using the pilot signals, for exact channel estimation, it is preferred that channel response is determined even for the subcarrier positions (frequency) where the pilot signals are not allocated. For such reason, it is necessary to determine the pilot signals of the subcarrier positions where pilot signals are not allocated by interpolating or extrapolating. Here, the accuracy of channel estimation is known to be lower when extrapolating rather than interpolating the pilot signals. Therefore, the accuracy of channel estimation can be improved by preferentially arranging the pilot subcarriers on both ends of the frequency direction within the subcarrier group as shown in FIG. 15 to reduce the necessity to extrapolate the pilot signals.

In the example shown in FIG. 16, pilot subcarriers are arranged preferentially on both ends of the time direction within the subcarrier group. When the variation of channel response is significant in the time direction, the necessity to extrapolate the pilot signals is reduced based on the same reason as the example of FIG. 15, and the channel estimation accuracy can be improved.

Allocation Method 2 of Pilot Subcarriers

A specific example of yet another layout method of the pilot subcarriers within the subcarrier group will be explained using FIGS. 17, 18, 19 and 20. Signals which differ among each OFDM transmitter are allocated to the subcarriers outside the subcarrier group. Accordingly, for the OFDM receiver to receive data subcarriers from a desired OFDM transmitter, it is necessary to estimate a channel response corresponding to the desired OFDM transmitter. According to the OFDM transmitter explained in FIG. 5, the signals 122 allocated to the subcarriers outside the subcarrier group are subject to scrambling by the scrambler 110. This enables the OFDM receiver to extract only the channel response corresponding to the desired OFDM transmitter.

Meanwhile, for the signals 121 allocated to the subcarriers within the subcarrier group, the complex numbers sequences by which the signals 121 are multiplied in each subcarrier group are orthogonalized or pseudo orthogonalized among the OFDM transmitters. Hereby, the channel corresponding to each OFDM transmitter can be estimated by using the pilot subcarriers within the subcarrier group. In other words, the pilot subcarriers within the subcarrier group and the pilot subcarriers outside the subcarrier group are used for a common purpose to revise the channel for the data subcarriers outside the subcarrier group. For such reason, it is preferred that at least some of the pilot subcarriers within the subcarrier group have the same format as the pilot subcarriers outside the subcarrier group.

Figure 17:
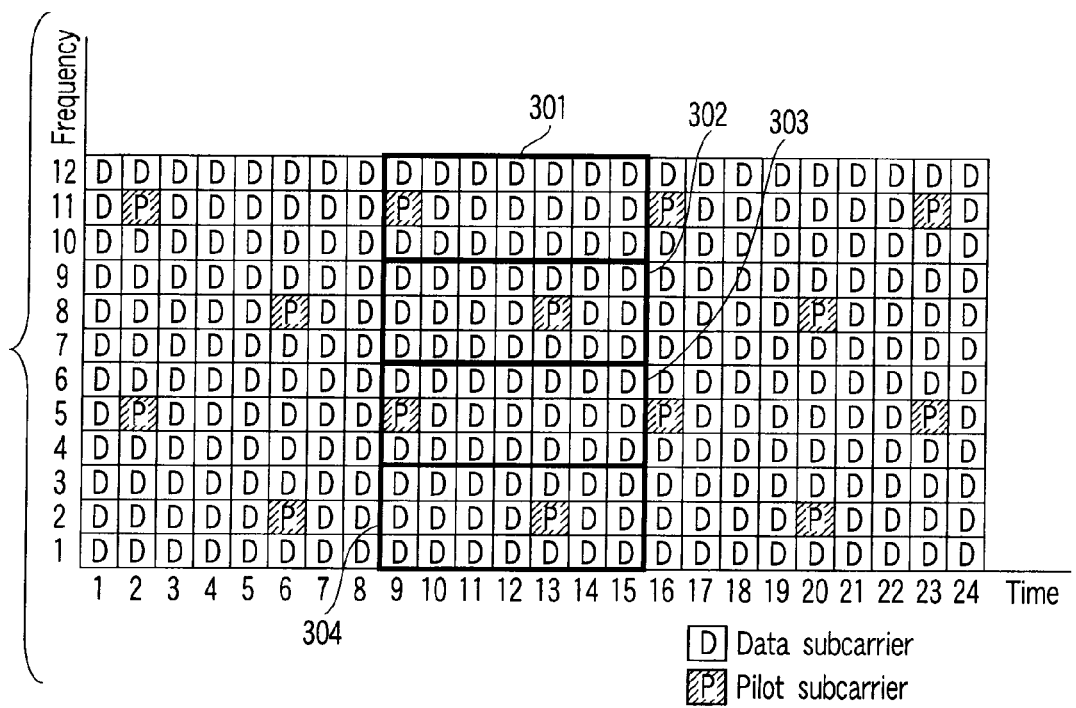
FIG. 17 illustrates the allocation method of the pilot subcarriers within the subcarrier group.

For example, in the case of assuming that the frequency position of the pilot subcarriers outside the subcarrier groups 301, 302, 303 and 304 changes with time as shown in FIG. 17, it is preferred that the frequency position of the pilot subcarriers within the subcarrier groups 301, 302, 303 and 304 is similarly changed with time. By doing so, when carrying out channel estimation for the data subcarriers outside the subcarrier groups, the pilot subcarriers within the subcarrier groups and the pilot subcarriers outside the subcarrier groups can be handled equally.

However, in such case, the positions of the pilot subcarriers within the subcarrier groups 301, 302, 303 and 304 differ for each of the subcarrier groups 301, 302, 303 and 304. For example, in the example shown in FIG. 17, one pilot subcarrier is arranged within each of the subcarrier groups 301, 302, 303 and 304. The positions of the pilot subcarriers within the subcarrier groups 301 and 303 and the positions of the pilot subcarriers within the subcarrier groups 302 and 304 are different from one another.

Figure 18:
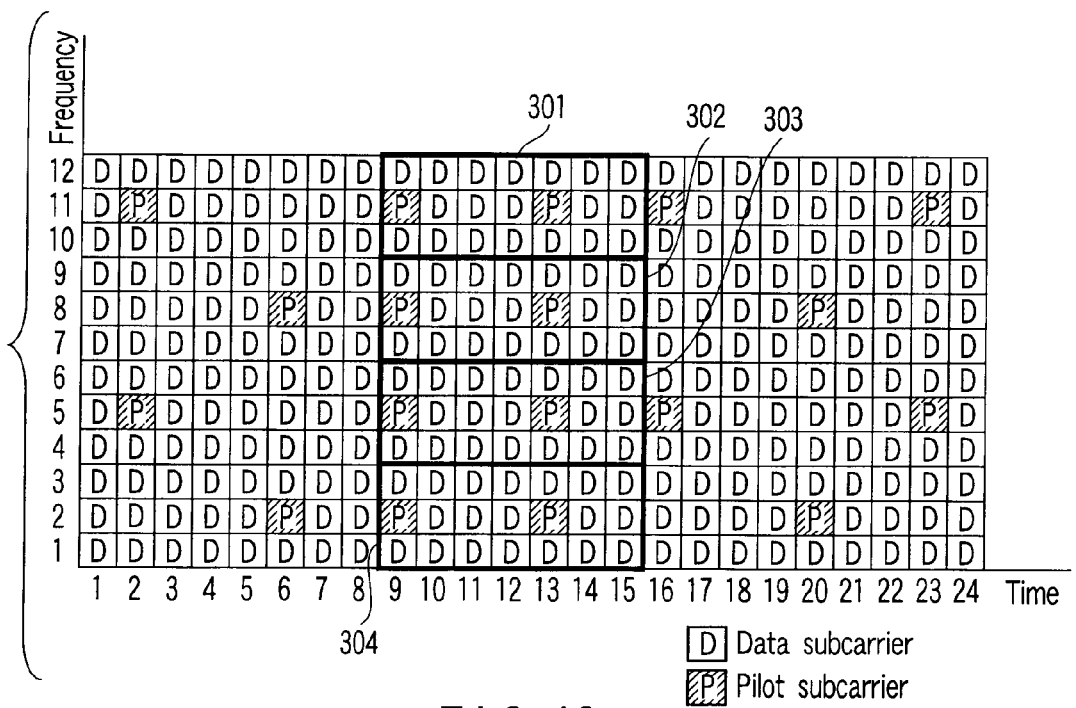
FIG. 18 illustrates the allocation method of the pilot subcarriers within the subcarrier group.

Meanwhile, in the example shown in FIG. 18, by adding a pilot subcarrier within the subcarrier groups 301, 302, 303 and 304, the positions of the pilot subcarriers for each of the subcarrier groups 301, 302, 303 and 304 are made identical. In other words, some of the pilot subcarriers within the subcarrier groups 301, 302, 303 and 304 in FIG. 18 have the same format as the pilot subcarriers outside the subcarrier groups 301, 302, 303 and 304. Accordingly, the accuracy of channel estimation among the subcarrier groups can be equalized.

According to FIGS. 17 and 18, the pilot subcarriers converge on one frequency position in each of the subcarrier groups 301, 302, 303 and 304. In contrast, in the example of FIG. 19, the pilot subcarriers are arranged scattered in a plurality of frequency positions in each of the subcarrier groups 301, 302, 303 and 304. According to the example of FIG. 19, the interpolating of a channel estimation value is effectively performed in the frequency direction as well. That is to say that the channel estimation can be performed with high accuracy even in an environment where there is a large delay spread (delay profile), and the channel response varies significantly in the frequency direction.

Figure 19:
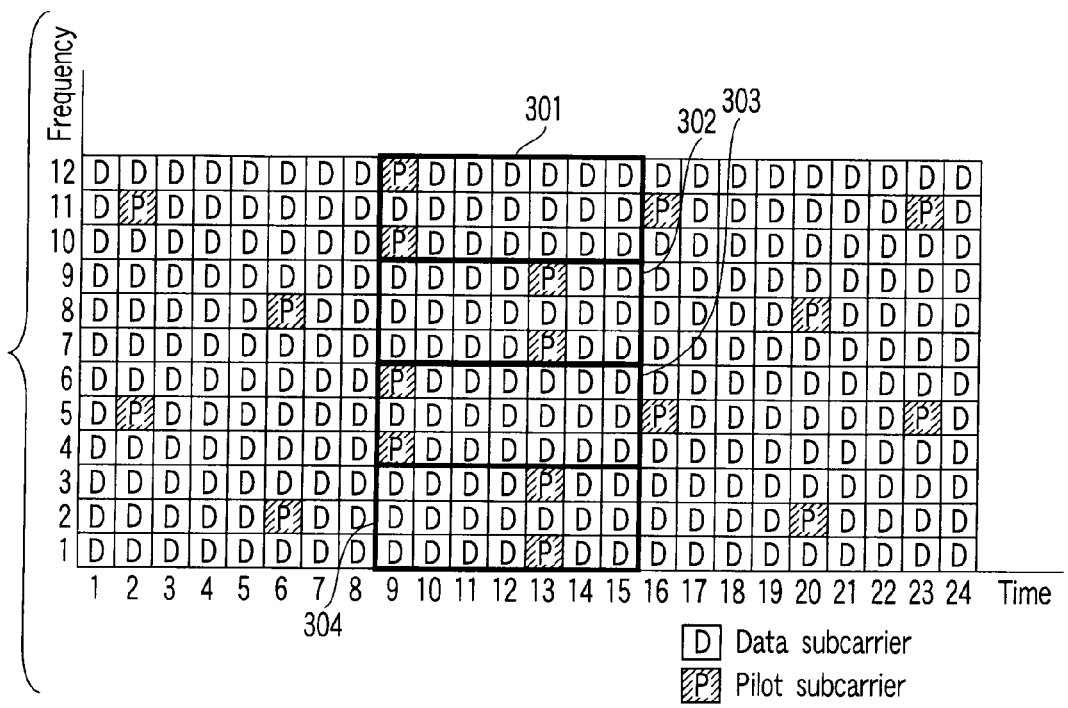
FIG. 19 illustrates the allocation method of the pilot subcarriers within the subcarrier group.
Figure 20:
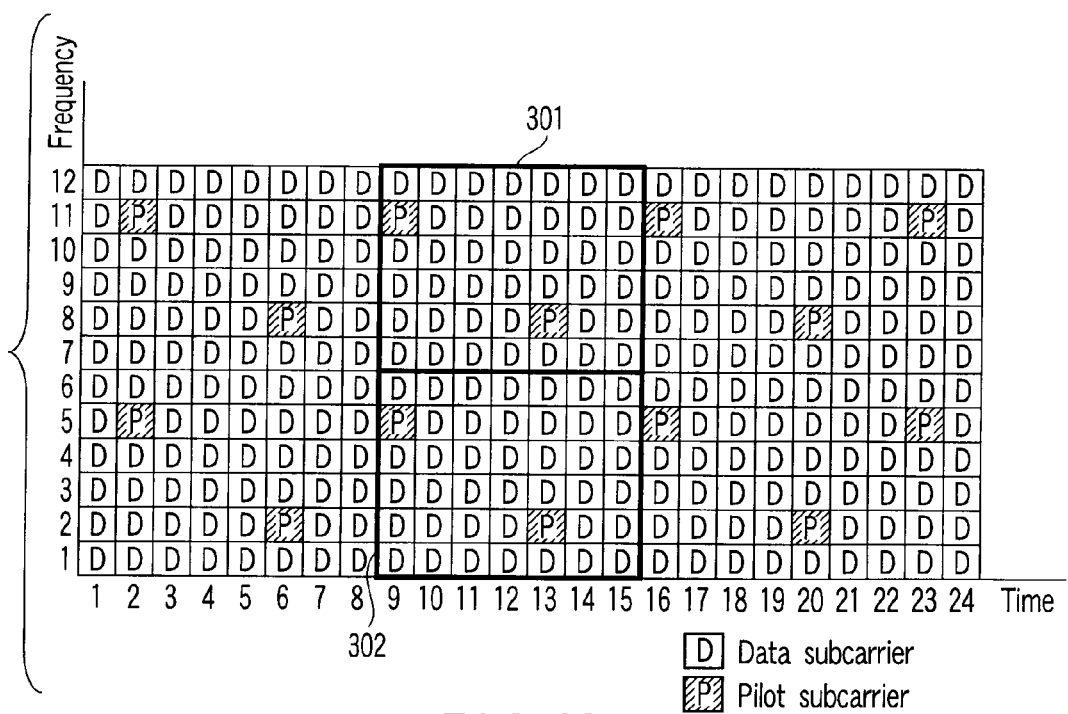
FIG. 20 illustrates the allocation method of the pilot subcarriers within the subcarrier group.

The methods of FIGS. 18 and 19 increase the number of pilot subcarriers within each subcarrier. Alternatively, the number of pilot subcarriers within a subcarrier group may also be increased by extending the domain of the subcarrier group. For example, in the example shown in FIG. 20, by setting a subcarrier group using two subcarrier groups shown in FIG. 17, the number of pilot subcarriers within each subcarrier group is increased to two. According to this example, the channel estimation value can be interpolated without increasing the overhead.

The receiving performances of the examples of FIGS. 17 and 19 will be explained using Table 1 and FIG. 21.

TABLE 1

| System Bandwidth | 10 MHz |
| Number of Subcarriers | 1024 |
| Number of Used Subcarriers | 600 |
| Subcarrier Interval | 15 kHz |
| Modulation Scheme | 16 QAM |
| Coding Scheme | Turbo encoding (Encoding rate 1/3) |

The reception characteristic was measured under the parameter shown in Table 1 by computer simulation. FIG. 21 shows the measurement result of the receiving performance. In FIG. 21, the horizontal axis represents SNR (Signal to Noise Ratio) and the vertical axis represents BLER (Block Error Rate). The block represents a unit for applying turbo encoding, wherein a plurality of bits are included in one block. The block is regarded as properly received in the case where all bits included in a block are received. In other words, in the case where even one of the bits included in a block fails, the block is regarded as received in error. BLER is calculated in such manner. As shown in FIG. 21, compared to the BLER performance in the example of FIG. 17, it is recognized that the BLER performance in the example of FIG. 19 is better. In the case where a smaller overhead is given priority over the BLER performance, the example of FIG. 17 shall be used, whereas, in the case where the BLER performance is given priority over a smaller overhead, the example of FIG. 19 shall be used.

Scrambling Sequence

An example of using different complex numbers sequences for each subcarrier group will be explained using FIGS. 22A and 22B. According to circumstances, a different or same sequence is chosen between the OFDM transmitters as the complex numbers sequence. Here, a specific example will be shown in the case of choosing a different complex numbers sequence between the OFDM transmitters.

Figure 22A:
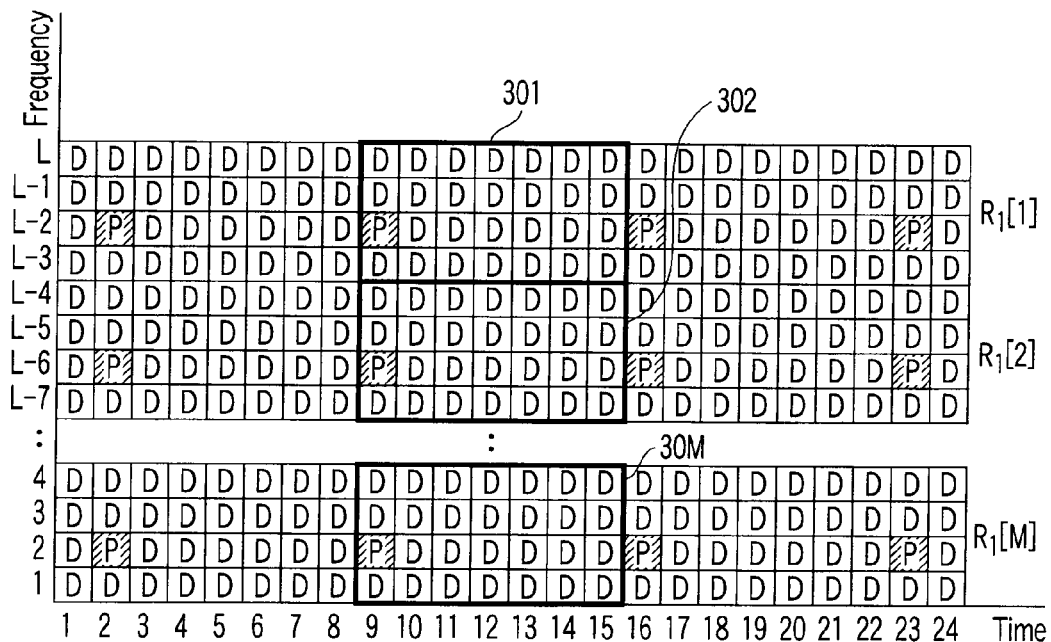
FIG. 22A illustrates a complex numbers sequence given to each subcarrier group.
Figure 22B:
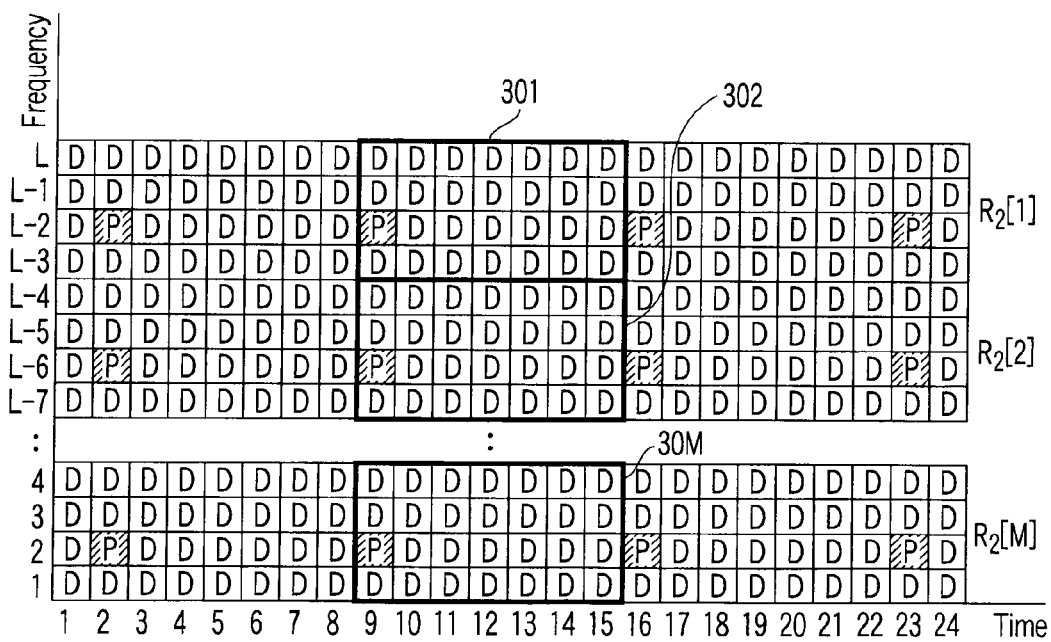
FIG. 22B illustrates a complex numbers sequence given to each subcarrier group.

FIGS. 22A and 22B each show the subcarrier arrangement of the OFDM signals transmitted from each of the OFDM transmitters 11 and 12 and the sequence of complex numbers. The sequence of complex numbers in FIG. 22A is $R_1[1]$, $R_1[2], \ldots, R_1[N]$, and in FIG. 22B is $R_2[1], R_2[2], \ldots, R_2[N]$. In the OFDM transmitter shown in FIG. 5, interference can be reduced for signals allocated to subcarriers outside the subcarrier group by subjecting such signals to scrambling. This is because signals from other OFDM transmitters become interferences, unlike the signals allocated to the subcarriers belonging to a subcarrier group.

Therefore, in this example, the complex numbers sequences of $R_1[1], R_1[2], \ldots, R_1[N]$ and $R_2[1], R_2[2], \ldots, R_2[N]$ are arranged mutually in orthogonal or pseudo orthogonal relation. This can also reduce interference for pilot signals allocated to pilot subcarriers within a subcarrier group, and can also be used for channel estimation in a non-macro diversity reception. Here, as mentioned earlier, "mutually orthogonal" means that the correlation value becomes 0, and "mutually pseudo orthogonal" means that the absolute value of correlation value becomes a smaller value than an auto-correlation value. The auto-correlation value of a certain sequence $x[k]$ ($k=1, \ldots, K$) and the correlation value of two sequences $x[k]$, $y[k]$ ($k=1, \ldots, K$) can be represented by the following equations.

$$\sum_{k=1}^{K} x[k] \cdot x[k]^* \quad (11)$$

$$\sum_{k=1}^{K} x[k] \cdot y[k]^* \quad (12)$$

When the sequence length is 4, the following four sequences $R_1$, $R_2$, $R_3$ and $R_4$ can be cited as an example of complex numbers sequence (orthogonalized sequence) mutually in orthogonal relations.

$$R_1 = \{+1, +1, +1, +1\}$$
$$R_2 = \{+1, +1, -1, -1\}$$
$$R_3 = \{+1, -1, -1, +1\}$$
$$R_4 = \{+1, -1, +1, -1\} \quad (13)$$

The four complex numbers sequences $R_1$, $R_2$, $R_3$ and $R_4$ in equation (13) have six correlation values all in 0, and are mutually orthogonal. Generally, when the sequence length is $2^K$, a maximum of $2^K$ pieces of orthogonalized sequences can be generated. Other examples, such as the four complex numbers sequences $R_1$, $R_2$, $R_3$ and $R_4$ below also have six correlation values all in 0, and are mutually orthogonal.

$$R_1 = \{+i, +i, +i, +i\}$$
$$R_2 = \{+i, +i, -i, -i\}$$
$$R_3 = \{+i, -i, -i, +i\}$$
$$R_4 = \{+i, -i, +i, -i\} \quad (14)$$

Meanwhile, as an example of complex numbers sequence in pseudo orthogonal relation (pseudo orthogonalized sequence), the following six sequences $R_1$, $R_2$, $R_3$, $R_4$, $R_5$ and $R_6$ can be cited.

$$R_1 = \{+1, +1, +1, +1\}$$
$$R_2 = \{+1, +1, -1, -1\}$$
$$R_3 = \{+1, -1, -1, +1\}$$
$$R_4 = \{+1, -1, +1, -1\}$$
$$R5 = \{+1, +1, +1, -1\}$$
$$R6 = \{+1, -1, +1, +1\} \quad (15)$$

For the six complex numbers sequences $R_1$, $R_2$, $R_3$, $R_4$, $R_5$ and $R_6$ in equation (15) in which the sequence length is 4, the correlation value is either 0 or 2 whereas each of the auto correlation values is 4. For instance, the six correlation values among $R_1$, $R_2$, $R_3$ and $R_4$ and the correlation value between $R_5$ and $R_6$ are all 0. However, the four correlation values between $R_1$, $R_2$, $R_3$ and $R_4$ and $R_5$ and $R_6$ are all 2. Accordingly, by including the pseudo orthogonalized sequences in the complex numbers sequences (i.e., sequences which do not restrict the correlation value to 0), more sequences can be generated than by the orthogonalized sequences (i.e. sequences which restrict the correlation value to 0).

In the case where the OFDM transmitter is a base station in a cellular system, and each cell in the cellular system comprises a plurality of sectors, the complex numbers sequence may be selected differently among the cells and among the sectors within the same cell. Generally, the interference among sectors within the same cell is larger than that among the cells. Therefore, it is preferred that the orthogonalized sequence is chosen among the same sectors, and the pseudo orthogonalized sequence is chosen among the cells. Such selection method of the complex numbers is effective also from the aspect of the number of sequences. In other words, since the number of sectors included in the same cell is less than the number of cells, sufficient allocation can be realized even with the orthogonalized sequence having less number of sequences.

The following is an example for selecting the orthogonalized sequence mutually among the sectors within identical cells and selecting the pseudo orthogonalized sequence among the cells. When the number of sectors included in each cell is assumed as S pieces and the number of cells is assumed as C pieces, S pieces of orthogonalized sequence and C pieces of pseudo orthogonalized sequence are prepared. For the sth sector of the cth cell, a sequence in which the cth pseudo orthogonalized sequence and the sth orthogonalized sequence are multiplied is used as the complex numbers sequence. By doing so, the complex numbers sequence is orthogonalized among the sectors within identical cells, and the complex numbers sequence is pseudo orthogonalized among the cells.

A specific example of each cell comprising a plurality of sectors will be explained using FIG. 23. FIG. 23 shows an example in which case each cell comprises three sectors. Each of the transmitters 601, 602 and 603 being base stations arranged adjacent to each other form sectors 604, 605 and 606 which are their cover areas and which form a cell. Similarly, sectors 614, 615 and 616 are formed by each of the OFDM transmitters 611, 612 and 613 arranged adjacent to each other. Sectors 614, 615 and 616 form another cell. Only two cells are shown in FIG. 23. However, in practice, there may be yet a plurality of cells arranged.

In the example of FIG. 23, since the number of sectors S is 3, three orthogonalized sequences should be prepared as the complex numbers sequence. As it is obvious from FIG. 23, a stronger interference tends to occur among different sectors included in the same cell compared to that among the cells. For this reason, it is preferred that an orthogonalized sequence with high interference decreasing effect is used among the sectors.

Third Example of the OFDM Receiver

Figure 24:
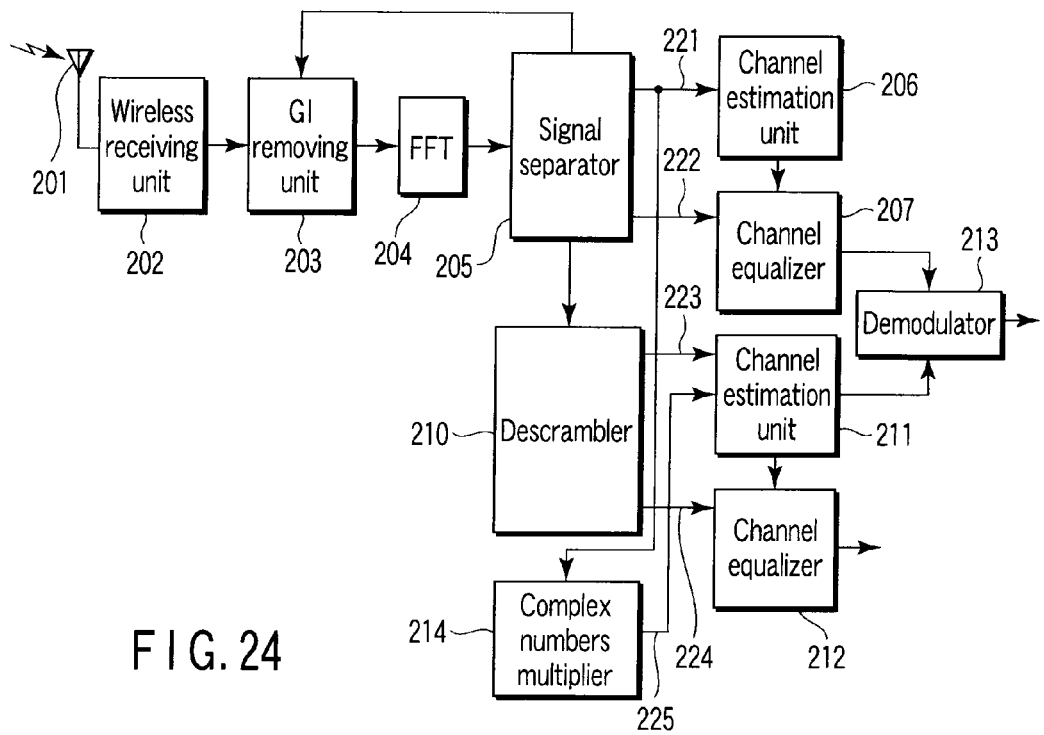
FIG. 24 is a block diagram showing a third example of the OFDM receiver in FIG. 1.

FIG. 24 shows an OFDM receiver suitable in the case where the complex numbers sequence is orthogonal or pseudo orthogonal between the transmitters. The differences between the OFDM receiver in FIG. 6 is that the pilot signal 221 allocated to the pilot subcarriers within the subcarrier group and output from the signal separator 205 is input to a complex numbers multiplier 214, that the pilot signal 225 multiplied by complex numbers by the complex numbers multiplier 214 is input to a channel estimation unit 211, and that the channel estimation unit 211 carries out channel estimation of the pilot signals 223 and 225.

Signals allocated to subcarriers within a subcarrier group are basically processed likewise the process in the OFDM receiver shown in FIG. 6. In other words, the pilot signal 221 and data signal 222 of each subcarrier group output from the signal separator 205 are input respectively to the channel estimation unit 206 and channel equalizer 207. The channel equalizer 207 equalizes the channel data 222 using the channel estimation value output from the channel estimation unit 206. The data signal obtained after channel equalization by the channel equalizer 207 is demodulated by the demodulator 213, and a bit string which is the source of the data signal is reproduced.

Meanwhile, signals allocated to subcarriers outside the subcarrier group are also processed likewise the process in the OFDM receiver shown in FIG. 6. In other words, a descrambler 210 descrambles the pilot signals and data signals allocated to subcarriers outside the subcarrier group and output from the signal separator 205. The descrambler 210 performs descrambling by an inverse scramble pattern of the scramble pattern used by an OFDM transmitter which transmits signals to be received by the OFDM receiver. The pilot signal 223 and data signal 224 descrambled by the descrambler 210 are respectively input to the channel estimation unit 211 and channel equalizer 212.

Meanwhile, the pilot signal 221 allocated to pilot subcarriers within the subcarrier group and output from the signal separator 205 is further multiplied by complex numbers by the complex numbers multiplier 214. The complex numbers multiplier 214 multiplies the pilot signal 221 by a complex number relevant to a complex conjugate of the complex number used by the complex numbers multiplier 105 shown in FIG. 5 within the OFDM transmitter transmitting signals to be received by the OFDM receiver. The pilot signal 225 multiplied by the complex numbers by the complex numbers multiplier 214 is input to the channel estimation unit 211.

The channel estimation unit 211 performs channel estimation by equalizing and interpolating adjacent pilot signals to calculate the channel estimation value which indicates channel response. The channel equalizer 212 equalizes the descrambled data signal using the channel estimation value output from the channel estimation unit 211. The data signal obtained after channel equalization by the channel equalizer 212 is input to the modulator 213, whereby a bit string being the source of the data signal is reproduced.

The averaging process carried out by the channel estimation unit 211 enables to lessen power for pilot signals transmitted from OFDM transmitters having different scrambling patterns, thereby improving the accuracy of a desired channel estimation value.

Further, the channel estimation unit 211 performs channel estimation using the pilot signal 225 allocated to the subcarriers within the subcarrier group and multiplied by a complex number by the complex numbers multiplier 214, in addition to the pilot signal 223 allocated to the subcarriers outside the subcarrier group and descrambled by the descrambler 210. Accordingly, the channel estimation unit 211 can use more pilot signals for channel estimation in comparison to the OFDM receiver in FIG. 6. Therefore, the accuracy of channel estimation can be further improved.

(Guard Interval Length Setting Method)

Now, a method for setting the length of guard interval added by the GI adding unit 107 shown in FIG. 2 or FIG. 5 will be explained. A guard interval is added by copying a part of a time waveform onto every OFDM symbol. It is possible to reduce interference between symbols caused by delay wave by adding a guard interval to the OFDM symbol. Generally, the longer the guard interval length the more it can endure a multipath environment of larger delay spread (delay profile).

As mentioned earlier, the OFDM receiver 20 is able to perform macro diversity reception for signals allocated to subcarriers within a subcarrier group. In such case, since the OFDM receiver 20 receives signals from a plurality of OFDM transmitters 11, 12, . . . , 1N simultaneously, in some cases, the delay spread may become relatively large in comparison to receiving signals from one transmitter.

Thus, the receiving performance for OFDM symbols which include subcarriers within a subcarrier group is improved by setting a longer guard interval than the other OFDM symbols. Specifically, as shown in FIGS. 2 and 5, the subcarrier group setting unit 104 provides the GI adding unit 107 with subcarrier position information which indicates the position of subcarriers within the subcarrier. When the OFDM symbol including at least one subcarrier within the subcarrier group is input from the IFFT unit 106, based on the subcarrier position information, the GI adding unit 107 adds to the OFDM signal a longer guard interval than in the case where an OFDM symbol including subcarriers outside the subcarrier group is input.

By setting the guard interval length in such manner, the OFDM receiver 20 deals with a large delay spread which occurs upon macro diversity reception, thereby improving reception performance.

Specific examples of setting the guard interval length will be described. For instance, in the example of subcarrier group setting shown in FIG. 7, the guard interval length for seven OFDM symbols including subcarriers within the subcarrier group is set longer than that for the OFDM symbols not including subcarriers within the subcarrier group. Meanwhile, in the example of subcarrier group setting shown in FIG. 11, the guard interval length for seven OFDM symbols including data subcarriers within the subcarrier group is set longer than that for the OFDM symbols not including data subcarriers within the subcarrier group. Further, in the example of subcarrier group setting shown in FIG. 11, the guard interval length for eight OFDM symbols including data and pilot subcarriers within the subcarrier group may be set longer than that for the OFDM symbols not including subcarriers within the subcarrier group.

Figure 25:
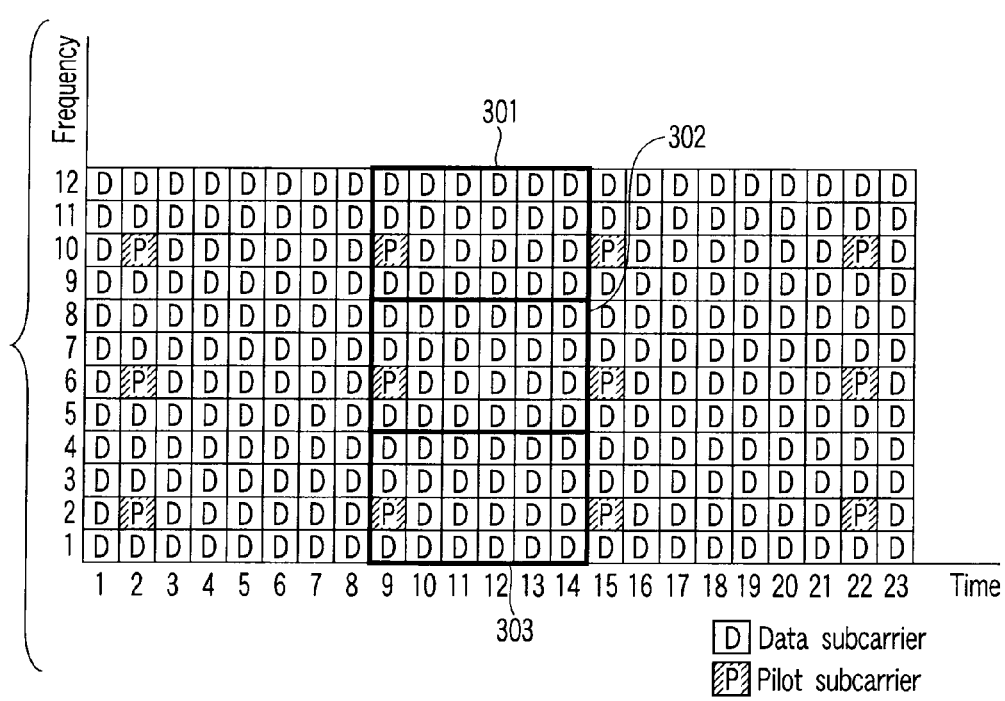
FIG. 25 illustrates the setting method of a guard interval length.

In the example of subcarrier group setting shown in FIG. 25, the guard interval length for OFDM symbols including subcarriers within the subcarrier group is set longer than the OFDM symbols not including subcarriers within the subcarrier group. Further, the OFDM symbols including subcarriers within the subcarrier group may be decimated.

Figure 26:
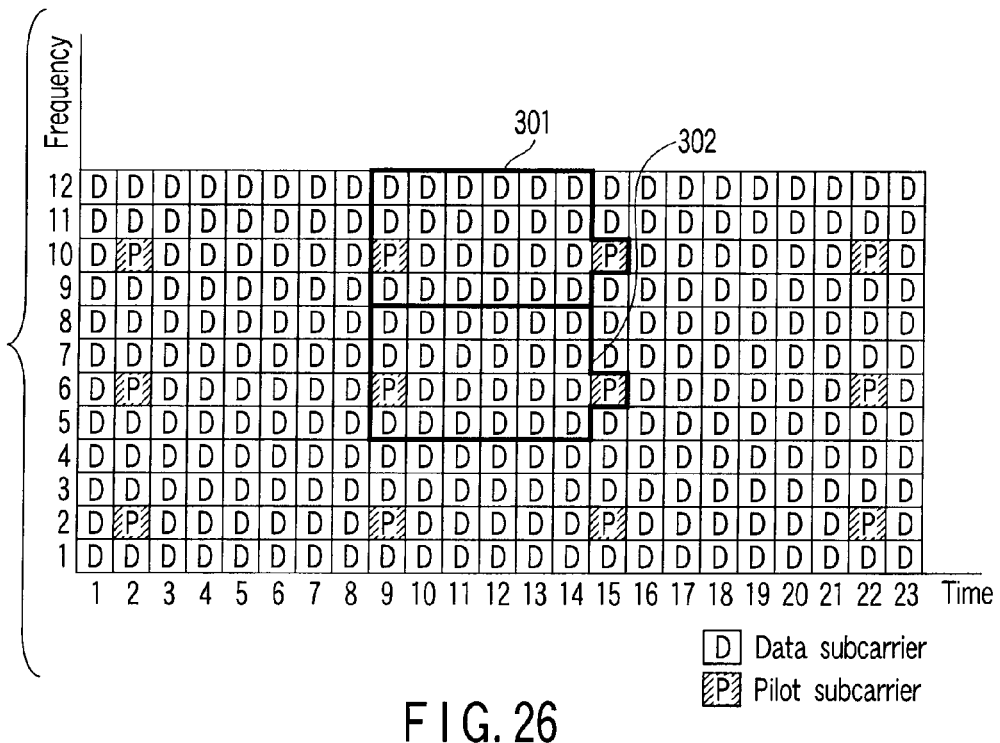
FIG. 26 illustrates the setting method of the guard interval length.

In the example of subcarrier group setting shown in FIG. 26, the guard interval length for OFDM symbols including data and pilot subcarriers within the subcarrier group is set longer than the OFDM symbols not including subcarriers within the subcarrier group. Further, the OFDM symbols including data and pilot subcarriers within the subcarrier group may be decimated.

Figure 27:
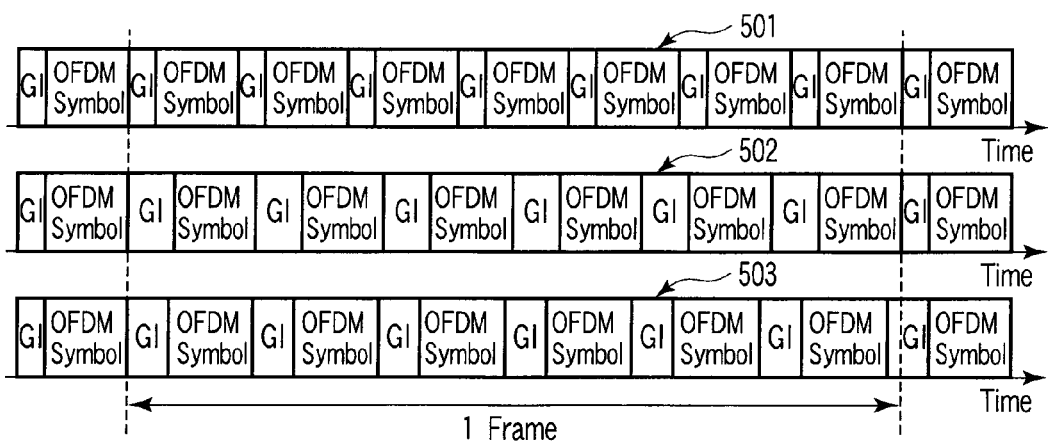
FIG. 27 illustrates an example of the guard interval length setting when decimating an OFDM symbol.

An example of setting the guard interval length in the case where the OFDM symbol is decimated as mentioned above will be explained using FIG. 27. In a usual guard interval length, one frame consists of seven OFDM symbols as shown by frame structure 501 in FIG. 21. For instance, when an OFDM symbol having a longer guard interval length than the other OFDM symbols is stored in one frame as in FIG. 19, at least one OFDM symbol is decimated as shown by frame structure 502, and the guard interval length is enlarged instead.

Likewise the case where the guard interval length of the OFDM symbol including data and pilot subcarriers within the subcarrier group is made larger than the other OFDM symbols in the example of FIG. 26, when the OFDM symbol with a longer guard interval length than the others cannot be stored within one frame, a part of the frame is allotted to the guard interval of the OFDM symbol positioned at the beginning of the succeeding frame as shown by frame structure 503. With that, the OFDM symbol of the subsequent frame need not be decimated, and only the guard interval length for the first OFDM symbol can be set longer.

Third Example of the OFDM Transmitter

The OFDM transmitter shown in FIG. 28 has a plurality of (two in the present example) wireless transmitting units 108A and 108B as in the transmitting side of, for example, the multi-input multi-output (MIMO) system. The first wireless transmitting unit 108A is connected to an antenna 109A and the second wireless transmitting unit 108B is connected to an antenna 109B.

In the OFDM transmitter of FIG. 28, a signal sorting unit 111 is arranged in the subsequent stage of the complex numbers multiplier 105. Further, a plurality of (two in the present example) IFFT units 106A and 106B and GI adding units 107A and 107B are arranged. The first wireless transmitting unit 108A and the second wireless transmitting unit 108B are respectively arranged in the subsequent stages of the GI adding units 107A and 107B.

Firstly, the process of the signals to be allocated to the subcarriers within the subcarrier group will be explained. The process up to the complex numbers multiplier 105 is the same as that in the OFDM transmitter of FIG. 2. The pilot signals and data signals within the subcarrier group, which are multiplied by complex numbers by the complex numbers multiplier 105, are input to the signal sorting unit 111. The signal sorting unit 111 supplies the signals (pilot signals and data signals) multiplied by the complex numbers to either one of the IFFT units 106A and 106B for each subcarrier group. In other words, the pilot signals and data signals allocated respectively to the pilot subcarriers and data subcarriers included in a certain subcarrier group are input to a corresponding IFFT unit.

In the IFFT units 106A and 106B, null signals are inserted into the subcarriers which were allocated neither the pilot signals nor the data signals. The input pilot signals, data signals and null signals are subject to OFDM modulation in the IFFT units 106A and 106B. As mentioned latter, in the IFFT units 106A and 106B, signals (data signals and pilot signals) 122A and 122B allocated to subcarriers outside the subcarrier group are also subject to OFDM modulation. The process subsequent to the OFDM modulation is basically the same as that in the OFDM transmitter shown in FIG. 2.

Now, the process of the signals 122A and 122B which are not allocated to the subcarriers within the subcarrier group (i.e., signals allocated to the subcarriers outside the subcarrier group) will be explained. The pilot signals and the data signals generated respectively by the pilot signal generator 101 and the data signal generator 102 are allocated to subcarriers by the subcarrier allocation unit 103. On such occasion, a subcarrier index representing the position of the corresponding subcarrier on the time axis and the frequency axis and an antenna index showing the antenna used for transmission are added to the pilot signals and data signals allocated to the subcarriers. The subcarrier index and the antenna index are added, for example, as follows.

(a) In the case of transmitting same signals from each antenna by subcarriers having the same subcarrier index: a plurality of pilot signals and data signals are generated wherein a same subcarrier index and a mutually different antenna index are added to the pilot signal and data signal generated by the pilot signal generator 101 and the data signal generator 102.

(b) In the case of transmitting different signals from each antenna by subcarriers having the same subcarrier index: a same subcarrier index and a mutually different antenna index are added respectively to the plurality of pilot signals and the plurality of data signals generated by the pilot signal generator 101 and the data signal generator 102.

(c) Depending on the antennas, in the case where the signals are not allocated to the subcarriers having the same subcarrier index: the combination of the subcarrier index and antenna index is added to neither of the pilot signals and the data signals generated by the pilot signal generator 101 and data signal generator 102.

The IFFT units 106A and 106B insert the null signals into the subcarriers identified by the combination of the subcarrier index and the antenna index which are added to none of the signals.

The signals to which the subcarrier index and antenna index are added in this manner are input to the subcarrier group setting unit 104. The subcarrier group setting unit 104 supplies the signals to the corresponding IFFT unit 106A or 106B in accordance with the antenna index added to the input signals. In the IFFT units 106A and 106B, the input signals are subject to OFDM modulation along with the signals allocated to subcarriers within the subcarrier group. In other words, in the IFFT unit 106A, signals 122A and signals 123A, and in the IFFT unit 106B, signals 122B and signals 123B are subject to OFDM modulation together. The process subsequent to the OFDM modulation is the same as that of the OFDM transmitter of FIG. 2.

Figure 29A:
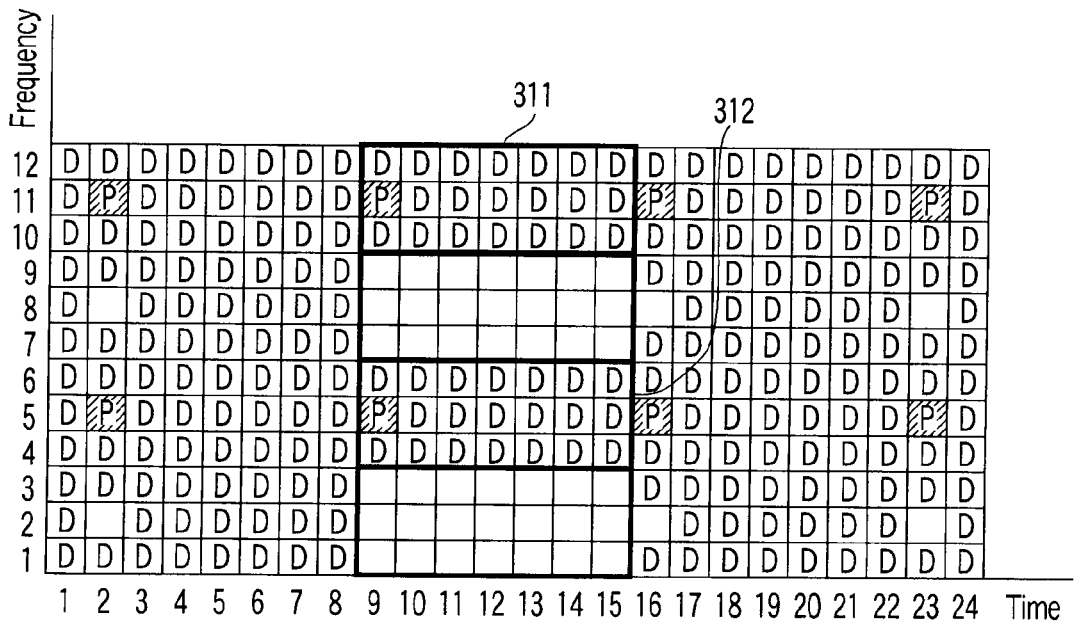
FIG. 29A illustrates the allocation method of a pilot subcarrier within a subcarrier group for the OFDM signal transmitted from one of the antennas in FIG. 28.

An example of the signals transmitted from the OFDM wireless transmitter of FIG. 28 will be explained using FIGS. 29A and 29B. FIG. 29A illustrates the transmission signal from the antenna 109A, and FIG. 29B illustrates the transmission signal from the antenna 109B.

Firstly, the allocation of signals to subcarriers outside the subcarrier group will be explained. In FIGS. 29A and 29B, the subcarriers in the position of OFDM symbol number 2, i.e., the subcarriers possessing subcarrier index (2, x) are taken notice of. X represents a subcarrier number.

In the OFDM signal transmitted from the antenna 109A, the pilot signals are allocated to subcarriers (pilot subcarriers) possessing subcarrier indexes (2, 5) and (2, 11) as shown in FIG. 29A. Null signals (the blank spaces shown in FIG. 29A) are allocated to subcarriers possessing subcarrier indexes (2, 2) and (2, 8).

Figure 29B:
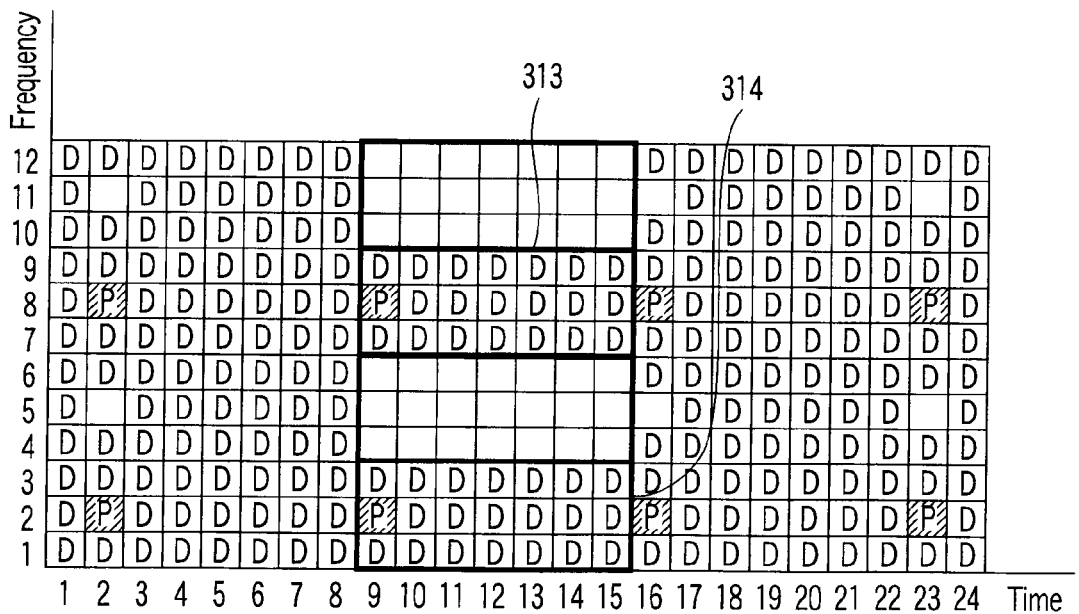
FIG. 29B illustrates the allocation method of the pilot subcarrier within the subcarrier group for the OFDM signal transmitted from one of the antennas in FIG. 28.

Meanwhile, in the OFDM signal transmitted from the antenna 109B, the pilot subcarriers are allocated to subcarriers (pilot subcarriers) possessing subcarrier indexes (2, 2) and (2,8) as shown in FIG. 29B. Null signals (the blank spaces shown in FIG. 29B) are allocated to subcarriers possessing subcarrier indexes (2, 5) and (2, 11).

In other words, the pilot signals of the OFDM signals transmitted from the antenna 109A and from the antenna 109B are respectively allocated to subcarriers possessing different subcarrier indexes. Further, null signals are allocated to subcarriers within the OFDM signal transmitted from one antenna when the subcarrier index of such subcarriers is the same as that of the subcarriers to which the pilot signals are allocated in the OFDM signal transmitted from the other antenna.

In such manner, by allocating the pilot signals and the null signals to subcarriers outside the subcarrier group, the OFDM receiver is able to receive the pilot signals within the OFDM signal of each antenna independently, thereby carrying out channel estimation for each antenna. This is especially effective in the case where the communication requires channel estimation corresponding to a plurality of antennas, such as time-space coding and space division multiplexing (SDM).

As above, in the case of transmitting pilot signals using different subcarriers for each antenna outside the subcarrier group, when transmitting pilot signals allocated to subcarriers within the subcarrier group, it is likewise preferable to use different subcarriers for each antenna. In such way, the channel estimation for each antenna can be carrier out using pilot signals allocated to subcarriers within the subcarrier group. As a result, the accuracy of channel estimation for data signals allocated to subcarriers outside the subcarrier group can be improved.

In the OFDM transmitter of FIG. 28, it is possible to choose the antenna to perform transmission for each subcarrier group. For example, as shown in Table 2, the signals allocated to the subcarriers within the subcarrier groups 311 and 312 shown in FIG. 29A are sorted to be transmitted from the antenna 109A and the signals allocated to the subcarriers within the subcarrier groups 313 and 314 shown in FIG. 29B are sorted to be transmitted from the antenna 109B. Such sorting is performed by the signal sorting unit 111 in FIG. 28.

TABLE 2

| Antenna | Subcarrier group |
|---------|------------------|
| 109A    | 311, 312         |
| 109B    | 313, 314         |

In the OFDM transmitter of FIG. 28, it is possible to choose the antenna to perform transmission for each subcarrier group. For example, it can be considered to transmit signals allocated to the subcarriers within the subcarrier groups 311 and 312 from the antenna 109A as shown in FIG. 29A, and transmit the signals allocated to the subcarriers within the subcarrier groups 313 and 314 from the antenna 109B as shown in FIG. 29B.

As above, by choosing the antenna to perform transmission for each subcarrier group, as for pilot signals, the antenna allocation for each subcarrier frequency position is made similar to that outside the subcarrier group. For example, in FIG. 29A, pilot signals are allocated to subcarriers possessing subcarrier indexes (2, 5) and (9, 5), and null signals are allocated to subcarriers possessing subcarrier indexes (2, 2) and (9, 2). In this case, the OFDM receiver estimates the channel corresponding to the antenna 109A by using subcarriers possessing subcarrier indexes (2, 5) and (9, 5), and estimates the channel corresponding to antenna 109B by using subcarriers possessing subcarrier indexes (2, 2) and (9, 2).

Meanwhile, all pilot subcarriers and data subcarriers within a certain subcarrier group are included in the OFDM signal transmitted from the same antenna. For this reason, when considering each subcarrier group, it is equivalent to the case of transmitting all signals from a single antenna as in the OFDM transmitter of FIG. 2. Therefore, among the OFDM signals transmitted from the OFDM transmitter of FIG. 28, it is possible for the OFDM receiver shown in FIG. 4, 6 or 23 to receive the signals allocated to subcarriers within the subcarrier group.

Further, in the case where the signals are sorted to different subcarriers among the plurality of OFDM transmitters, the signals allocated to subcarriers within the subcarrier group can be received by the OFDM receiver shown in FIG. 4, 6 or 24. For example, a certain OFDM transmitter (for instance, the OFDM transmitter 11 in FIG. 1) requires channel estimation for each antenna for subcarriers outside the subcarrier group. In the case where another OFDM transmitter (for instance, the OFDM transmitter 12 in FIG. 1) does not require channel estimation for each antenna for subcarriers outside the subcarrier group, the certain OFDM transmitter 11 transmits the signals represented in FIG. 29A from the antenna 109A and transmits the signals represented in FIG. 29B from the antenna 109B.

Figure 29C:
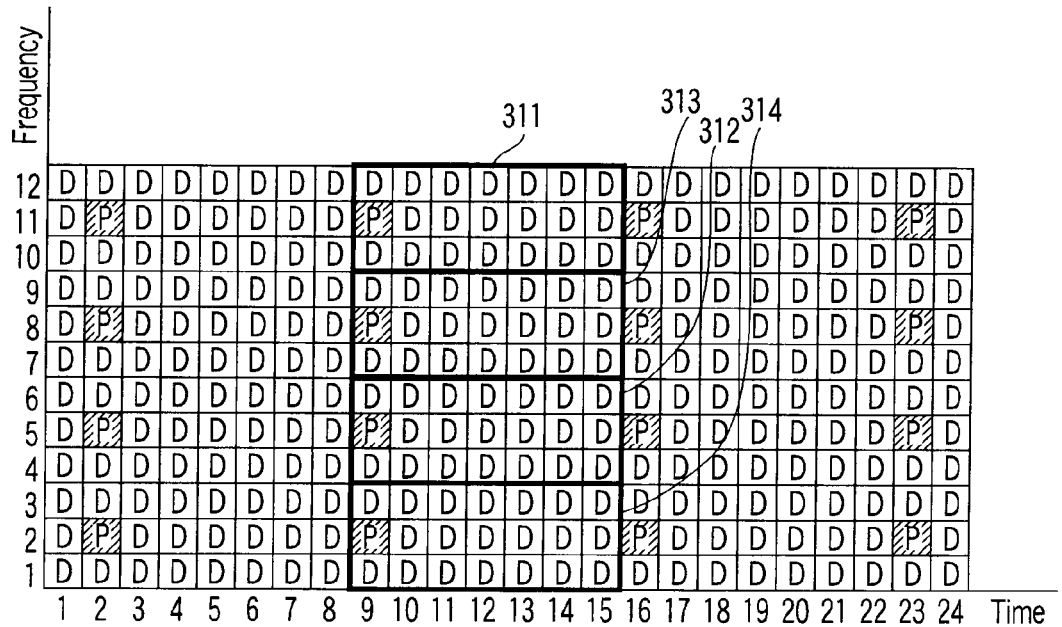
FIG. 29C illustrates the allocation method of the pilot subcarrier within the subcarrier group for the OFDM signal transmitted from one of the antennas in FIG. 28.
Figure 29D:
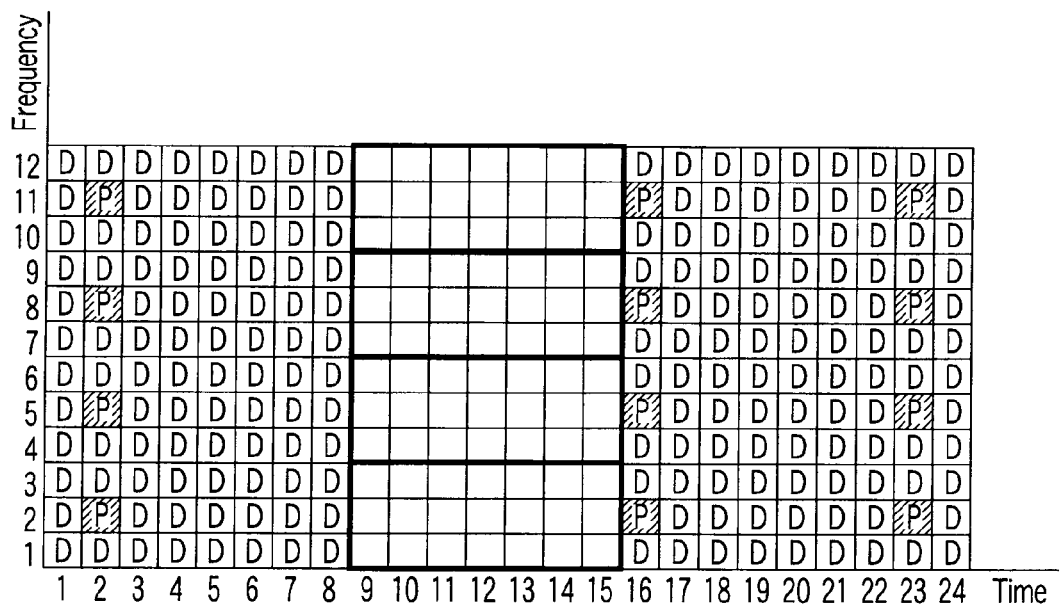
FIG. 29D illustrates the allocation method of the pilot subcarrier within the subcarrier group for the OFDM signal transmitted from one of the antennas in FIG. 28.

Meanwhile, another OFDM transmitter 12 transmits the subcarrier groups 311 to 314 from the antenna 109A, and the antenna 109B transmits the null signals (transmits nothing) as shown in FIG. 29D. Even in the case of sorting signals as above, it can be considered equivalent to the case of transmitting all signals from a single antenna as in the OFDM transmitter of FIG. 2, in that, from the perspective of each subcarrier group, transmission is carried out from a single antenna with respect to each OFDM transmitter. It means that the subcarrier group 312 is transmitted from a certain OFDM transmitter by using only the antenna 109B and transmitted from another OFDM transmitter by using only 109A. For this reason, it is possible for the OFDM receiver shown in FIG. 4, 6 or 24 to receive the signals transmitted from the OFDM transmitter of FIG. 28.

In either case of sorting the same signals among a plurality of OFDM transmitters as shown in "signal sorting 1" in Table 3 or sorting different signals among the OFDM transmitters as shown in "signal sorting 2", it is possible for the OFDM receiver shown in FIG. 4, 6 or 24 to receive the signals within the subcarrier group. This is effective in that the signal sorting can be set freely for each OFDM transmitter. More specifically, this is because signal sorting can be selected appropriately in the case where the OFDM transmitters requiring channel estimation and not requiring channel estimation for each antenna are mixed.

TABLE 3

| OFDM transmitter | Antenna | Signal sorting 1 | Signal sorting 2 |
|------------------|---------|------------------|------------------|
| 11 in FIG. 1     | 109A    | 311, 312         | 311, 312         |
|                  | 109B    | 313, 314         | 313, 314         |
| 12 in FIG. 1     | 109A    | 311, 312         | 311, 312, 313, 314 |
|                  | 109B    | 313, 314         | none             |

According to the OFDM signal transmitted from the OFDM transmitter of FIG. 28, in the case where the OFDM receiver requires channel estimation for each antenna in the receiving process of the data subcarriers outside the subcarrier group, it is possible to estimate the channel for each antenna by using the pilot subcarrier within the subcarrier group. Accordingly, the accuracy of channel estimation corresponding to the data subcarriers outside the subcarrier group improves. In addition, the data subcarriers within the subcarrier group can be received in the same process as in the OFDM receiver in FIG. 4. This not only allows a simplified structure of the receiver but also brings about an effect of being able to reduce the overhead of control accompanied in the switching of the receiving method.

Further, as is obvious from the comparison between FIGS. 28 and 2, when extracting only one branch of components subsequent to and including the IFFT unit, the OFDM transmitter of FIG. 28 is equivalent to the OFDM transmitter of FIG. 2. In other words, it is obvious that a process equivalent to the OFDM transmitter of FIG. 28 can be performed also by arranging a plurality of OFDM transmitters which respectively possess the structure of FIG. 2. Specifically, by appropriately selecting the complex numbers by which the signals allocated to the subcarriers within the subcarrier group is multiplied from either zero or non-zero at the plurality of OFDM transmitters respectively possessing the structure shown in FIG. 2, it is possible to transmit signals which are equivalent to those of the OFDM transmitter of FIG. 28.

Data Signal Contents

An example of the contents of data signal allocated to data subcarriers within a subcarrier group will be explained. The OFDM transmitter shown in FIG. 2 or FIG. 5 is a base station for a cellular system (mobile phone system). Explanations will be carried on through the example in which the OFDM receiver shown in FIG. 4, 6 or 18 is a terminal. The base station may form a plurality of sectors. In such case, the base station includes as many OFDM transmitters as the number of sectors. The data signal is used for, such as, broadcast communication, multicast communication or soft handover as follows.

Firstly, examples of carrying out broadcast communication and multicast communication are described. Same data signals are allocated to data subcarriers within the subcarrier group and transmitted from a plurality of base stations. In such case, all terminals connected to the base station are able to receive the same data signals simultaneously. Accordingly, the cellular system is able to perform broadcast communication and multicast communication by utilizing the subcarriers within the subcarrier group. A broadcast communication is referred to as a service to transmit data signals without specifying the user. A multicast communication is referred to as a service to transmit the same data signals to two or more specified terminals. In some cases, the broadcast communication and multicast communication are collectively called the Multimedia Broadcast and Multicast Service (MBMS) communication. Meanwhile, a service to transmit data to one specific terminal is referred to as a unicast.

Accordingly, it may be considered to use broadcast communication and multicast communication for subcarriers within the subcarrier group, and unicast communication for subcarriers outside the subcarrier group. For instance, a streaming of moving image data or music data, and multi-address transmission of e-mail can be cited as an example of transmitting data signals by broadcast communication or multicast communication.

An example of conducting soft handover will be explained. Same data signals are allocated to data subcarriers within the subcarrier group and transmitted from a plurality of base stations. In such case, terminals on the cell borderline are able to receive signals simultaneously from the plurality of base stations bordering the borderline. Accordingly, the cellular system is able to realize the soft handover as follows by utilizing data signals allocated to subcarriers within the subcarrier group.

Firstly, while the terminal exists near the center of the cell of a first base station, it carries out usual reception of data signals allocated to subcarriers outside the subcarrier group set by the first base station. Next, when the terminal comes near the boundary of the cells between the first base station and a second base station adjacent thereto, it performs macro diversity reception of the data signals allocated to subcarriers within each subcarrier group set by the first and second base stations. Subsequently, when the terminal moves to the center area of the cell of the second base station, it performs usual reception of data signals allocated to subcarriers outside the subcarrier group set by the second base station. In such manner, soft handover can be conducted using data signals allocated to a subcarrier group.

Fourth Example of the OFDM Transmitter

An example of an OFDM transmitter with a subcarrier allocation unit including the function relevant to the subcarrier group setting unit in the OFDM transmitter of FIG. 28 will be explained. In the OFDM transmitter shown in FIG. 30, the signal 121 (pilot signal and data signal) allocated to the subcarrier within a specific time-frequency domain is input directly to the complex numbers multiplier 105 from the subcarrier allocation unit 103. Signals 122A (pilot signal and data signal) and 122B (pilot signal and data signal) allocated to subcarriers outside the specific time-frequency domain are input directly to an IFFT unit 106A or 106B from the subcarrier allocation unit 103.

The setting process of the subcarrier group, and the process of multiplying the pilot signals and the data signals allocated to subcarriers within the subcarrier group by complex numbers given for each subcarrier group are equivalent to the process of multiplying the pilot signals and data signals allocated to subcarriers within the specific time-frequency domain, which is relevant to subcarriers within the subcarrier group, by complex numbers.

In the example of FIG. 29A, to multiply the signals allocated to subcarriers within the subcarrier groups 311 and 312 by the complex numbers R[1] and R[2] given for each subcarrier groups 311 and 312 is equivalent to the processes of (1), (2) and (3) below.

(1) Multiplying the signals allocated to subcarriers possessing subcarrier indexes (9, 1) to (9, 12) by 0, 0, 0, R[2], R[2], R[2], 0, 0, 0, R[1], R[1], and R[1].

(2) Multiplying the signals allocated to subcarriers possessing subcarrier indexes (10, 1) to (10, 12) respectively by 0, 0, 0, R[2], R[2], R[2], 0, 0, 0, R[1], R[1], and R[1].

(3) Similarly, as above, multiplying the signals allocated to subcarriers possessing subcarrier indexes up to (15, 12) respectively by 0, 0, 0, R[2], R[2], R[2], 0, 0, 0, R[1], R[1], and R[1].

Also, for the examples of FIGS. 29B, 29C and 29D, the signals allocated to the subcarriers within each subcarrier group can be multiplied by complex numbers given for each subcarrier group likewise in the case of the example of FIG. 29A.

As mentioned above, according to the embodiments of the present invention, the subcarriers within the subcarrier group at the transmitter side, i.e., the signals allocated to subcarriers within the specific time-frequency domain are multiplied not only with respect to pilot signals but also with respect to data signals by complex numbers. As a result, in the case of performing the macro diversity reception in the specific time-frequency domain at the receiver side, the sum of the channel response for all channels can be obtained without requiring the process for obtaining the channel response for all channels individually. Accordingly, it is possible to resolve the problems of the increase in calculation amount, the deterioration in channel estimation accuracy due to interference and the complexity of control.

In addition, in the case where the OFDM transmitter transmits pilot signals which are outside the subcarrier group using different subcarriers for each antenna by a plurality of wireless transmitting unit, the pilot signals allocated to subcarriers within the subcarrier group are also transmitted by using different subcarriers for each antenna. Therefore, channel estimation can be carried out for each antenna using pilot signals allocated to subcarriers within the subcarrier group. As a result, the accuracy of channel estimation for data signals allocated to subcarriers outside the subcarrier group can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The present invention is of service to macro diversity reception for wireless communication systems.

What is claimed is:

1. A method of transmitting orthogonal frequency division multiplexing (OFDM) signals wirelessly from a plurality of OFDM transmitters respectively each including a plurality of wireless transmitting units, comprising;

allocating a first pilot signal and a first data signal which are both common among the OFDM transmitters respectively to at least one first pilot subcarrier and first data subcarriers within a specific time-frequency domain that is common among the OFDM transmitters and different among the wireless transmitting units;

allocating a second pilot signal and a second data signal respectively to at least one second pilot subcarrier and second data subcarriers outside the time-frequency domain;

multiplying the first pilot signal and the first data signal by a complex number set for the time-frequency domain;

generating an OFDM signal by performing OFDM modulation on the first pilot signal and the first data signal multiplied by the complex number and the second pilot signal and the second data signal; and transmitting the OFDM signal.

2. The method according to claim 1, wherein one of the wireless transmitting units included in a first OFDM transmitter corresponds to a first time-frequency domain, another of the wireless transmitting units included in the first OFDM transmitter corresponding to a second time-frequency domain, each of the first time-frequency domain and the second time-frequency domain including at least one pilot subcarrier and data subcarriers, frequencies of the first time-frequency domain being different from frequencies of the second time-frequency domain, and one of the wireless transmitting units included in a second OFDM transmitter corresponds to a third time-frequency domain, another of the wireless transmitting units included in the second OFDM transmitter corresponding to a fourth time-frequency domain, the third time-frequency domain including at least one pilot subcarrier and data subcarriers, only null signals being allocated to the fourth time-frequency domain, the first OFDM transmitter and the second OFDM transmitter included in the OFDM transmitters.

3. A method of transmitting OFDM signals wirelessly by a plurality of OFDM transmitters respectively each including a plurality of wireless transmitting units, comprising;

allocating a first pilot signal and a first data signal which are both common among the OFDM transmitters respectively to at least one first pilot subcarrier and first data subcarriers;

allocating a second pilot signal and a second data signal respectively to at least one second pilot subcarrier and second data subcarriers;

setting at least one subcarrier group by a plurality of subcarriers including first pilot subcarriers and the first data subcarriers, which are common among the OFDM transmitters and different among the wireless transmitting units;

multiplying the first pilot signal and the first data signal by a complex number set for each of the subcarrier groups;

generating the OFDM signal by performing OFDM modulation on the first pilot signal and the first data signal multiplied by the complex number and the second pilot signal and the second data signal; and transmitting the OFDM signal.

4. The method of transmitting OFDM signals according to claim 3, further comprising scrambling the second pilot signal and the second data signal in accordance with a predetermined scramble pattern, the OFDM modulation carried out by performing the OFDM modulation on the scrambled second pilot signal and the second data signal.

5. The method according to claim 3, wherein one of the wireless transmitting units included in a first OFDM transmitter corresponds to a first time-frequency domain, another of the wireless transmitting units included in the first OFDM transmitter corresponding to a second time-frequency domain, each of the first time-frequency domain and the second time-frequency domain including at least one pilot subcarrier and data subcarriers, frequencies of the first time-frequency domain being different from frequencies of the second time-frequency domain, and one of the wireless transmitting units included in a second OFDM transmitter corresponds to a third time-frequency domain, another of the wireless transmitting units included in the second OFDM transmitter corresponding to a fourth time-frequency domain, the third time-frequency domain including at least one pilot subcarrier and data subcarriers, only null signals being allocated to the fourth time-frequency domain, the first OFDM transmitter and the second OFDM transmitter included in the OFDM transmitters.

6. An OFDM transmitter comprising;

a plurality of wireless transmitting units configured to transmit the OFDM signals wirelessly;

an allocation unit configured to allocate a first pilot signal and a first data signal respectively to at least one first pilot subcarrier and first data subcarriers within a specific time-frequency domain that is set differently among the wireless transmitting units, and to allocate a second pilot signal and a second data signal respectively to at least one second pilot subcarrier and second data subcarriers outside the specific time-frequency domain;

a multiplier to multiply the first pilot signal and the first data signal by a complex number set for each of the specific time-frequency domain; and a modulator configure to generate the OFDM signals to be supplied to the wireless transmitting units by performing OFDM modulation on the first pilot signal and the first data signal multiplied by the complex number and the second pilot signal and the second data signal.

7. The transmitter according to claim 6, wherein one of the wireless transmitting units included in the OFDM transmitter corresponds to a first time-frequency domain, another of the wireless transmitting units included in the OFDM transmitter corresponding to a second time-frequency domain, each of the first time-frequency domain and the second time-frequency domain including at least one pilot subcarrier and data subcarriers, frequencies of the first time-frequency domain being different from frequencies of the second time-frequency domain, or one of the wireless transmitting units included in the OFDM transmitter corresponds to a third time-frequency domain, another of the wireless transmitting units included in the OFDM transmitter corresponding to a fourth time-frequency domain, the third time-frequency domain including at least one pilot subcarrier and data subcarriers, only null signals being allocated to the fourth time-frequency domain.

8. An OFDM transmitter comprising;

a plurality of wireless transmitting units configured to transmit the OFDM signals wirelessly;

an allocation unit configured to allocate a first pilot signal and a first data signal respectively to at least one first pilot subcarrier and the first data subcarriers, and to allocate a second pilot signal and a second data signal respectively to at least one second pilot subcarrier and the second data subcarriers;

a subcarrier group setting unit configured to set a subcarrier group which is set differently among the wireless transmitting units by a plurality of subcarriers including the first pilot subcarrier and the first data subcarriers;

a multiplier to multiply the first pilot signal and the first data signal by a complex number set for each of the subcarrier groups; and a modulator configure to generate an OFDM signal to be supplied to the wireless transmitting units by performing OFDM modulation on the first pilot signal and the first data signal multiplied by the complex number by the multiplier and the second pilot signal and the second data signal.

9. The OFDM transmitter according to claim 8, further comprising a scrambler configured to scramble the second pilot signal and the second data signal in accordance with a predetermined scramble pattern, and the modulator configured to generate the OFDM signals to be supplied to the wireless transmitting units by performing OFDM modulation on the scrambled second pilot signal and second data signal.

10. The OFDM transmitter according to claim 8, wherein the subcarrier group setting unit is configured to set the subcarrier group by the first pilot subcarrier and the first data subcarrier arranged within a specific rectangular time-frequency domain.

11. The OFDM transmitter according to claim 8, wherein the subcarrier group setting unit is configured to set the subcarrier group by the first pilot subcarrier and the first data subcarriers included in a plurality of successive OFDM symbols.

12. The OFDM transmitter according to claim 8, wherein the subcarrier group setting unit is configured to set the subcarrier group by the first pilot subcarrier and the first data subcarrier arranged within a specific rectangular time-frequency domain and by at least one first pilot subcarrier positioned on the frequency axis identical to at least one of the first pilot subcarriers or the first data subcarriers arranged within the rectangular time-frequency domain, and positioned on a different time axis so that it is arranged outside the rectangular time-frequency domain.

13. The OFDM transmitter according to claim 8, wherein the subcarrier group setting unit is configured to set the subcarrier group by the first pilot subcarrier and the first data subcarrier included in a plurality of successive OFDM symbols and by the first pilot subcarrier included in at least one OFDM symbol each including a frequency identical to at least one first pilot subcarrier or first data subcarriers within the plurality of successive OFDM symbols, and adjacent to the plurality of successive OFDM symbols.

14. The OFDM transmitter according to claim 8, wherein the subcarrier group setting unit is configured to set the subcarrier group so that the first pilot subcarrier is arranged dispersed within the subcarrier group.

15. The OFDM transmitter according to claim 8, wherein the subcarrier group setting unit is configured to set the subcarrier group so that the first pilot subcarriers are preferentially arrange on ends of a frequency axis direction within the subcarrier group.

16. The OFDM transmitter according to claim 8, wherein the subcarrier group setting unit is configured to set the subcarrier group so that the pilot subcarriers are preferentially arrange on ends of a time axis direction within the subcarrier group.

17. The OFDM transmitter according to claim 8, wherein the multiplier uses a sequence of a complex number which is set for each of the subcarrier groups as the complex number and set so as to establish a mutually orthogonal or pseudo orthogonal relation among the other OFDM transmitters.

18. The OFDM transmitter according to claim 17, wherein the sequence of the complex number is set so that correlation value of the sequence of the complex numbers among other OFDM transmitters is smaller than the auto-correlation value of the sequence of the complex numbers.

19. An OFDM receiver comprising;
a receiving unit configured to receive the OFDM signal transmitted from the OFDM transmitter according to claim 8;
an OFDM demodulator configured to subject the received OFDM signal to OFDM demodulation to divide the received OFDM signal into signals corresponding to each of the subcarriers;
a separator to separate from signals corresponding to each of the subcarriers the first pilot signal and the first data signal allocated respectively to the first pilot subcarrier and the first data subcarriers included in at least one subcarrier group;
an estimation unit configured to estimate channel response using the separated first pilot signal;
an equalizer to equalize the separated first data signal in accordance with the estimated channel response; and
a data demodulator to demodulate the equalized first data signal.

20. The receiver according to claim 19, being used as a terminal for a cellular system.

21. An OFDM receiver comprising;
a receiving unit configured to receive the OFDM signal transmitted from the OFDM transmitter according to claim 8;
an OFDM demodulator to subject the received OFDM signal to OFDM demodulation to divide the received OFDM signal into signals corresponding to each of the subcarriers;
a separator to separate from the signals corresponding to each of the subcarriers the first pilot signal and the first data signal allocated respectively to the first pilot subcarriers and the first data subcarriers included in at least one subcarrier group, and the second pilot signal and the second data signal allocated to the second pilot subcarriers and the second data subcarriers outside the subcarrier group;
a first estimation unit configured to estimate a first channel response using the first pilot signal;
a first equalizer to equalize the first data signal, in accordance with the estimated first channel response;
a descrambler to descramble the second pilot signal and the second data signal;
a second estimation unit configured to estimate the second channel response using the descrambled second pilot signal;
a second equalizer to equalize the descrambled second data signal, in accordance with the estimated second channel response; and
a data demodulator to demodulate the equalized first data signal and the equalized second data signal.

22. The OFDM receiver according to claim 21, further comprising a multiplier configured to multiply the separated first pilot signal by a complex number, the second estimation unit configured to estimate the second channel response using the descrambled second pilot signal and the first pilot signal multiplied by the complex number.

23. The OFDM transmitter according to claim 8, wherein the modulator generates a first OFDM symbol including subcarriers within the subcarrier group and a second OFDM symbol other than the first OFDM symbol by the OFDM modulation to generate the OFDM signal to be supplied to the wireless transmitting unit, and is configured to add a first guard interval and a second guard interval respectively to the first OFDM symbol and the second OFDM symbol, the length of at least one part of the first guard interval is longer than the second guard interval.

24. The OFDM transmitter according to claim 8, wherein the modulator generates the first OFDM symbol including the first data subcarriers within the subcarrier group and the second OFDM symbol other than the first OFDM symbol by the OFDM modulation to generate the OFDM signal to be supplied to the wireless transmitting unit, and is configured to add the first guard interval and the second guard interval respectively to the first OFDM symbol and the second OFDM symbol, the length of at least one part of the first guard interval is longer than the second guard interval.

25. The OFDM transmitter according to claim 8, further comprising a sorting unit configured to sort the first pilot signals and the first data signals multiplied by the complex number and the second pilot signals and the second data signals in correspondence with the wireless transmitting unit, the modulator to perform the OFDM modulation on the sorted first pilot signals, first data signals, second pilot signals and second data signals.

26. The transmitter according to claim 8, being used as a base station for a cellular system.

27. The transmitter according to claim 8, wherein one of the wireless transmitting units included in the OFDM transmitter corresponds to a first time-frequency domain, another of the wireless transmitting units included in the OFDM transmitter corresponding to a second time-frequency domain, each of the first time-frequency domain and the second time-frequency domain including at least one pilot subcarrier and data subcarriers, frequencies of the first time-frequency domain being different from frequencies of the second time-frequency domain, or one of the wireless transmitting units included in the OFDM transmitter corresponds to a third time-frequency domain, another of the wireless transmitting units included in the OFDM transmitter corresponding to a fourth time-frequency domain, the third time-frequency domain including at least one pilot subcarrier and data subcarriers, only null signals being allocated to the fourth time-frequency domain.

* * * * *